United States Patent
Liu et al.

(10) Patent No.: US 12,305,126 B2
(45) Date of Patent: May 20, 2025

(54) HYDROCRACKING CATALYSTS AND USES THEREOF

(71) Applicant: UNIVERSITY OF DELAWARE, Newark, DE (US)

(72) Inventors: Sibao Liu, Tianjin (CN); Dionisios G. Vlachos, Voorhees, NJ (US)

(73) Assignee: UNIVERSITY OF DELAWARE, Newark, DE (US)

( * ) Notice: Subject to any disclaimer, the term of this patent is extended or adjusted under 35 U.S.C. 154(b) by 206 days.

(21) Appl. No.: 18/010,917

(22) PCT Filed: Jun. 17, 2021

(86) PCT No.: PCT/US2021/037751
§ 371 (c)(1),
(2) Date: Dec. 16, 2022

(87) PCT Pub. No.: WO2021/257783
PCT Pub. Date: Dec. 23, 2021

(65) Prior Publication Data
US 2023/0323219 A1    Oct. 12, 2023

Related U.S. Application Data

(60) Provisional application No. 63/040,581, filed on Jun. 18, 2020.

(51) Int. Cl.
*C10G 47/18* (2006.01)
*B01J 23/30* (2006.01)
(Continued)

(52) U.S. Cl.
CPC ............. *C10G 47/18* (2013.01); *B01J 23/30* (2013.01); *B01J 23/42* (2013.01); *B01J 29/068* (2013.01);
(Continued)

(58) Field of Classification Search
CPC ............ C10G 47/18; C10G 2300/4006; C10G 2300/4012; C10G 2300/4025;
(Continued)

(56) References Cited

U.S. PATENT DOCUMENTS

| | | |
|---|---|---|
| 8,404,912 B1 | 3/2013 | Miller |
| 2002/0028853 A1 | 3/2002 | Manzer et al. |

(Continued)

FOREIGN PATENT DOCUMENTS

| | | |
|---|---|---|
| EP | 2055380 | 5/2009 |
| WO | 2006131507 | 12/2006 |

OTHER PUBLICATIONS

Zhu et al. ("SiO2 promoted Pt/WOx/ZrO2 catalysts for the selective hydrogenolysis of glycerol to 1,3-propanediol", Applied Catalysis B: Environmental 158-159 (2014) 391-399). (Year: 2014).*

(Continued)

*Primary Examiner* — Ali Z Fadhel
(74) *Attorney, Agent, or Firm* — McCarter & English, LLP

(57) ABSTRACT

The present disclosure provides a catalyst represented by Formula (I)

$$X[(RO_a)(QO_b)]*Z \quad (I),$$

wherein the moiety $X[(RO_a)(QO_b)]$ and the moiety Z are mechanically mixed; wherein the weight percentage of the moiety Z is about 1% to about 99% of the total weight of the catalyst. Furthermore, the present disclosure provides a tunable, low-temperature, energy-efficient process for hydrocracking plastics to form a fuel, a lubricant, or a mixture thereof.

19 Claims, 12 Drawing Sheets

(51) Int. Cl.
  *B01J 23/42*  (2006.01)
  *B01J 29/068* (2006.01)
  *B01J 35/64*  (2024.01)

(52) U.S. Cl.
  CPC .... *B01J 35/643* (2024.01); *C10G 2300/4006* (2013.01); *C10G 2300/4012* (2013.01); *C10G 2300/4025* (2013.01)

(58) Field of Classification Search
  CPC ............ C10G 2400/02; C10G 2400/04; C10G 2400/08; C10G 2400/10; C10G 1/10; B01J 23/30; B01J 23/42; B01J 29/068; B01J 35/643; B01J 23/002; B01J 23/6527; B01J 37/0201; B01J 37/088; B01J 37/18; B01J 21/066; B01J 2229/14; B01J 2229/38; B01J 29/041; B01J 29/084; B01J 29/18; B01J 29/40; B01J 29/7007
  See application file for complete search history.

(56) References Cited

U.S. PATENT DOCUMENTS

| | | | |
|---|---|---|---|
| 2012/0165583 A1* | 6/2012 | Garforth | C08J 11/16 423/700 |
| 2012/0310023 A1* | 12/2012 | Huang | C10G 1/002 585/241 |
| 2013/0153463 A1* | 6/2013 | Geerinck | B01J 37/0201 208/111.1 |
| 2014/0228204 A1 | 8/2014 | Narayanaswamy et al. | |
| 2015/0158018 A1* | 6/2015 | Zhan | B01J 35/617 502/64 |
| 2016/0264874 A1* | 9/2016 | Narayanaswamy | C10G 1/10 |
| 2016/0264885 A1* | 9/2016 | Narayanaswamy | C10B 53/07 |
| 2018/0216009 A1* | 8/2018 | Narayanaswamy | C10G 1/08 |
| 2018/0371327 A1* | 12/2018 | Streiff | B01J 29/40 |
| 2019/0233744 A1* | 8/2019 | Narayanaswamy | C10G 47/06 |
| 2020/0017773 A1 | 1/2020 | Ramamurthy et al. | |
| 2020/0238269 A1* | 7/2020 | Delferro | C08F 8/50 |
| 2021/0061971 A1* | 3/2021 | Delferro | C08J 11/16 |
| 2021/0071088 A1* | 3/2021 | Liu | C10G 1/10 |
| 2023/0211326 A1* | 7/2023 | Wang | C10G 1/06 502/66 |
| 2023/0272292 A1* | 8/2023 | Weiss | C10G 1/10 585/241 |
| 2023/0287283 A1* | 9/2023 | Weiss | C10G 65/12 |

OTHER PUBLICATIONS

International Search Report pertaining to International Application No. PCT/US2021/037751, dated Oct. 26, 2021, pp. 1-5.
Written Opinion pertaining to International Application No. PCT/US2021/037751, dated Oct. 26, 2021, pp. 1-6.
Zhu, Shanhui, et al., "SiO2 Promoted Pt/WOx/ZrO2 Catalysts for the Selective Hydrogenolysis of Glycerol to 1,3-Propanediol", Applied Catalysis B: Environmental, Feb. 2014, vol. 158-159, pp. 391-399.
Liu, Sabao, et al., "Plastic Waste to Fuels by Hydrocracking at Mild Conditions", Science Advances, Apr. 21, 2021, vol. 7, pp. 1-10.
Shunning, Shang, et al., "Influence of Preparative Method on Al2O3-doped Pt/WO3—ZrO2 Catalyst for N-heptane Isomerization", Chinese Journal of Catalysis, Dec. 2013, vol. 34, pp. 898-905.

* cited by examiner

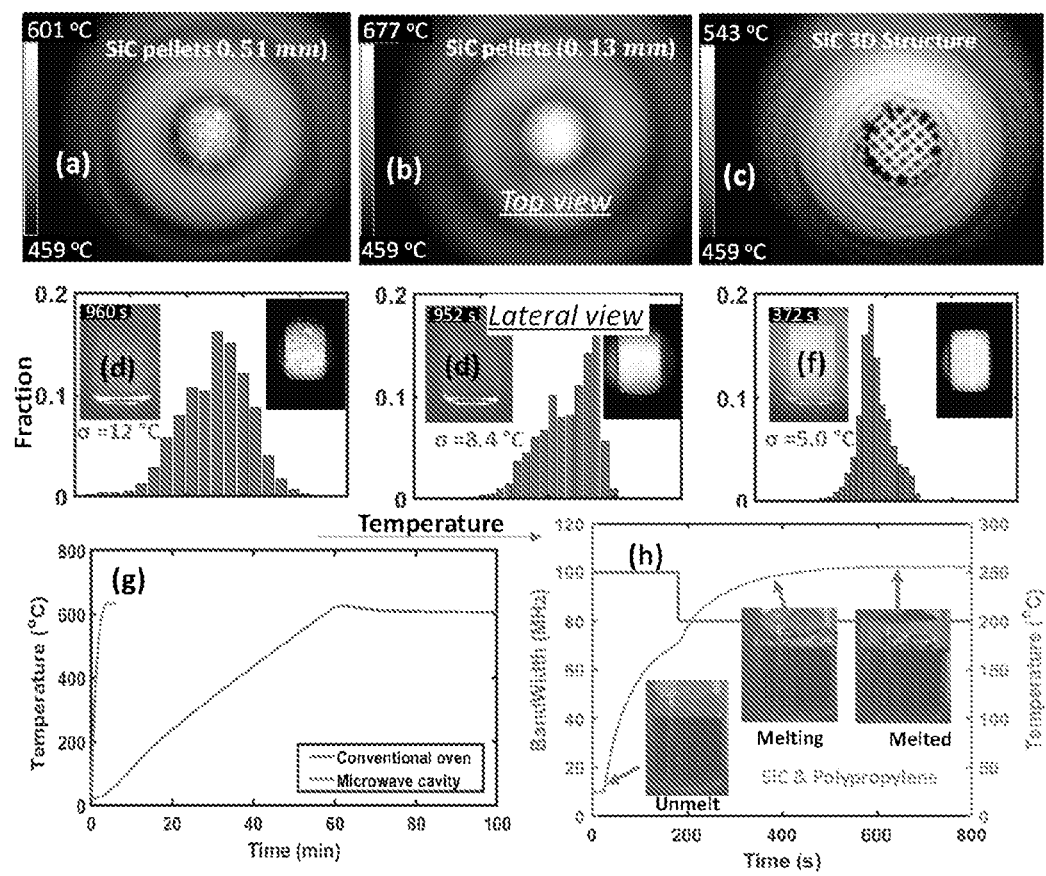
FIGs. 1a-h

HYDROCRACKING CATALYSTS AND USES THEREOF

CROSS REFERENCE TO RELATED APPLICATIONS

This application is a national stage application filed under 35 U.S.C. § 371 of PCT/US2021/037751, filed Jun. 17, 2021, which claims the benefit of U.S. Provisional Patent Application Ser. No. 63/040,581, filed Jun. 18, 2020, the contents of each of which are herein incorporated by reference.

STATEMENT OF GOVERNMENT SUPPORT

This invention was made with government support under DE-SC0001004 awarded by the U.S. Department of Energy. The government has certain rights in the invention.

BACKGROUND

Plastics are an indispensable part of modern life. Global plastic production reached 314 million tons in 2014 and is projected to increase to over 1200 million tons by 2050. This growth is alarming when considering the current plastic waste management. In the United States, >75% of plastics are disposed in landfills and <16% are incinerated, and only <9% are recycled. Unrecycled plastics generate large economic loss and emissions and harm the environment. Current repurposing routes, such as mechanical processing, require substantial amounts of virgin material and lead to lower-value products. Chemical conversion is the most versatile and robust approach to combat plastics waste. Thermal or catalytic pyrolysis alone at 400° to 600° C. or pyrolysis followed by catalytic hydrotreatment has been exploited. Over $SiO_2$—$Al_2O_3$ and zeolites, e.g., HY and HZSM-5, the selectivity to monomers, gasoline-range hydrocarbons, or diesel is low. Instead, undesired high fractions of light $C_1$-$C_4$ hydrocarbons, tar, and coke form. High temperatures are required to cleave the resilient C-C bonds, especially of polyethylene (PE) and polypropylene (PP), which give polymers their mechanical stability. High temperatures require significant energy and lead to low selectivity of valuable products.

Accordingly, there is a need for an improved catalytic technology that is tunable, low-temperature, energy-efficient, and mixed-feedstock-agnostic and therefor substantially reduces the environmental footprint of modern plastics.

SUMMARY DESCRIPTION

The present disclosure provides a selective and agnostic catalyst that efficiently converts plastic to tunable fuels at low temperatures. In comparison to pyrolysis, the catalyst described herein provides significant energy savings: nearly two-fold or more in heating due to low operating temperatures in the melt and two to four-fold for carrying out cracking vs. hydrogenolysis chemistry due to making hydrogenated products of larger molecular weight.

In one embodiment, the present disclosure provides a catalyst represented by formula (I).

$$X[(RO_a)(QO_b)]*Z \qquad (I),$$

wherein
X is a noble metal selected from the group consisting of ruthenium, rhodium, palladium, osmium, iridium, and platinum;
R and Q independently are a transition metal;
O is oxygen;
a and b independently are 1, 2, 3, or 4;
Z is a zeolite or a mesoporous material; and
the symbol "*" means that the moiety $X[(RO_a)(QO_b)]$ and the moiety Z are mechanically mixed; wherein the weight percentage of the moiety Z is about 1% to about 99% of the total weight of the catalyst.

It was unexpected to find that the catalyst described herein is very active and selective for mild hydrocracking of plastics, e.g. low-density polyethylene (LDPE), producing a mixture of gasoline, diesel, and jet-range hydrocarbons. It was found that $X[(RO_a)(QO_b)]$ alone shows low activity for plastics conversion in the melt phase while mechanically blending material Z with $X[(RO_a)(QO_b)]$ substantially increases the catalyst activity. It is surprising to find the strong synergy between Z and $X[(RO_a)(QO_b)]$ in converting plastics into desirable fuels and light lubricants at mild conditions.

The present disclosure further provides a process for hydrocracking plastics, comprising contacting the plastics with a catalyst in a hydrogen atmosphere at a temperature between about 150° C. and about 800° C. for a period of time between about 0.1 hours and about 120 hours to form a fuel, a lubricant, or a mixture thereof; wherein the catalyst is represented by Formula (I):

$$X[(RO_a)(QO_b)]*Z \qquad \text{(I), and}$$

wherein
X is a noble metal selected from the group consisting of ruthenium, rhodium, palladium, osmium, iridium, and platinum;
R and Q independently are a transition metal;
O is oxygen;
a and b independently are 1, 2, 3, or 4;
Z is a zeolite or a mesoporous material; and
the symbol "*" means that the moiety $X[(RO_a)(QO_b)]$ and the moiety Z are mechanically mixed; wherein the weight percentage of the moiety Z is about 1% to about 99% of the total weight of the catalyst.

BRIEF DESCRIPTION OF THE FIGURES

FIG. 1a shows a top view of the temperature field of the microwave-heated SiC pellets (0.51 mm).

FIG. 1b shows a top view of the temperature field of the microwave-heated SiC pellets (0.13 mm).

FIG. 1c shows a top view of the temperature field of the microwave-heated SiC 3D structure.

FIG. 1d shows a side view of the temperature field of the microwave-heated SiC pellets (0.51 mm).

FIG. 1e shows a side view of the temperature field of the microwave-heated SiC pellets (0.13 mm).

FIG. 1f shows a side view of the temperature field of the microwave-heated SiC 3D structure.

FIG. 1g shows that the microwave heating system of the present disclosure provides rapid, volumetric, and uniform heating at a much shorter time than the conventional oven.

FIG. 1h shows the melting process of the mixture of SiC and polypropylene in the microwave heating system of the present disclosure.

DETAILED DESCRIPTION

1. Catalysts

Figure 2A:
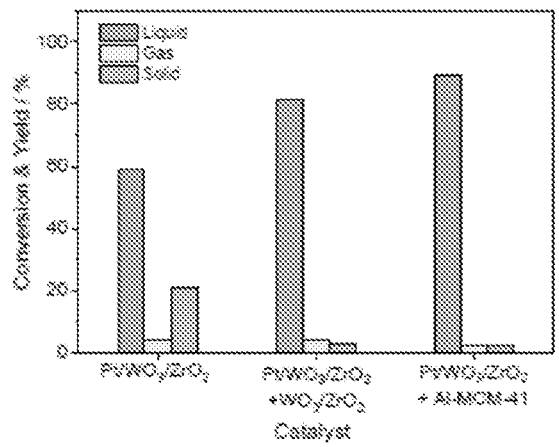
FIG. 2a shows the yields of the reaction of LDPE to fuels and lubricants with three different catalysts.

In the first aspect, the present disclosure provides a selective and agnostic catalyst that efficiently converts plastic to tunable fuels at low temperatures.

In a first embodiment, the present disclosure provides a catalyst represented by Formula (I):

$$X[(RO_a)(QO_b)]*Z \qquad (I),$$ 

wherein
X is a noble metal selected from the group consisting of ruthenium, rhodium, palladium, osmium, iridium, and platinum;
R and Q independently are a transition metal;
O is oxygen;
a and b independently are 1, 2, 3, or 4;
Z is a zeolite or a mesoporous material; and
the symbol "*" means that the moiety X[(RO$_a$)(QO$_b$)] and the moiety Z are mechanically mixed; wherein the weight percentage of the moiety Z is about 1% to about 99% of the total weight of the catalyst.

In a second embodiment, the present disclosure provides a catalyst according to the first embodiment, wherein X is a noble metal selected from the group consisting of rhodium, palladium, and platinum. The definitions of the remaining variables are provided in the first embodiment of the first aspect.

In a third embodiment, the present disclosure provides a catalyst according to the first embodiment or second embodiment, wherein X is platinum. The definitions of the remaining variables are provided in the first embodiment or the second embodiment of the first aspect.

In a fourth embodiment, the present disclosure provides a catalyst according to the first through third embodiments, wherein R and Q are independently selected from a group consisting of tungsten, nickel, iron, cobalt, molybdenum, zinc, copper, manganese, chromium, titanium, vanadium, and zirconium. The definitions of the remaining variables are provided in the first through third embodiment of the first aspect.

In a fifth embodiment, the present disclosure provides a catalyst according to the first through fourth embodiments, wherein R and Q are independently selected from a group consisting of tungsten, molybdenum, chromium, titanium, and zirconium. The definitions of the remaining variables are provided in the first through fourth embodiments of the first aspect.

In a sixth embodiment, the present disclosure provides a catalyst according to the first through fifth embodiments, wherein
R is tungsten;
a is 3;
Q is zirconium; and
b is 2.

The definitions of the remaining variables are provided in the first through fifth embodiments of the first aspect.

In a seventh embodiment, the present disclosure provides a catalyst according to the first through sixth embodiments, wherein the weight percentage of the component X is about 0.01% to about 50% of the weight of the moiety X[(RO$_a$)(QO$_b$)]. The definitions of the remaining variables are provided in the first through sixth embodiments of the first aspect. In one embodiment, the weight percentage of the component X is about 0.01% to about 45%, about 0.01% to about 40%, about 0.01% to about 35%, about 0.01% to about 30%, 0.01% to about 25%, about 0.01% to about 20%, about 0.01% to about 15%, about 0.01% to about 10%, about 0.01% to about 5.0%, about 0.05% to about 5.0%, about 0.1% to about 5.0%, about 0.2% to about 5.0%, about 0.3% to about 5.0%, about 0.4% to about 5.0%, about 0.5% to about 5.0%, about 0.6% to about 5.0%, about 0.7% to about 5.0%, about 0.8% to about 5.0%, about 0.9% to about 5.0%, about 1.0% to about 5.0%, about 1.0% to about 4.0%, about 1.0% to about 3.0%, about 1.0% to about 2.0%, or about 1.0% to about 1.5% of the weight of the moiety X[(RO$_a$)(QO$_b$)]. In one embodiment, the weight percentage of the component X is about 0.01%, about 0.05%, about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, about 1.0%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10%, about 15%, about 20%, about 25%, about 30%, about 35%, about 40%, about 45%, or about 50% of the weight of the moiety X[(RO$_a$)(QO$_b$)].

In an eighth embodiment, the present disclosure provides a catalyst according to the first through seventh embodiments, wherein the weight percentage of the component X is about 0.3% to about 5.0% of the weight of the moiety X[(RO$_a$)(QO$_b$)]. The definitions of the remaining variables are provided in the first through seventh embodiments of the first aspect. In one embodiment, the weight percentage of the component X is about 0.3% to about 4.5%, about 0.3% to about 4.0%, about 0.3% to about 3.5%, about 0.3% to about 3.0%, about 0.3% to about 2.5%, about 0.3% to about 2.0%, about 0.3% to about 1.5%, about 0.3% to about 1.0%, about 0.3% to about 0.9%, about 0.3% to about 0.8%, about 0.3% to about 0.7%, about 0.3% to about 0.6%, about 0.3% to about 0.5%, or about 0.3% to about 0.4%. In one embodiment, the weight percentage of the component X is about 0.3%, about 0.4%, about 0.5%, about 0.6%, about 0.7%, about 0.8%, about 0.9%, about 1.0%, about 1.5%, about 2.0%, about 2.5%, about 3.0%, about 3.5%, about 4.0%, about 4.5%, or about 5.0%.

In a ninth embodiment, the present disclosure provides a catalyst according to the first through eighth embodiments, wherein the weight percentage of the component X is about 0.5% of the weight of the moiety $X[(RO_a)(QO_b)]$. The definitions of the remaining variables are provided in the first through eighth embodiments of the first aspect.

In a tenth embodiment, the present disclosure provides a catalyst according to the first through ninth embodiments, wherein the weight percentage of the component $(RO_a)$ is about 0.5% to about 99.9% of the weight of the moiety $[(RO_a)(QO_b)]$. The definitions of the remaining variables are provided in the first through ninth embodiments and other embodiments described herein of the first aspect. In one embodiment, the weight percentage of the component $(RO_a)$ is about 0.5% to about 99%, about 0.5% to about 95%, about 0.5% to about 90%, about 0.5% to about 85%, about 0.5% to about 80%, about 0.5% to about 75%, about 0.5% to about 70%, about 0.5% to about 65%, about 0.5% to about 60%, about 0.5% to about 55%, about 0.5% to about 50%, about 0.5% to about 45%, about 0.5% to about 40%, about 0.5% to about 35%, about 0.5% to about 30%, about 0.5% to about 25%, about 0.5% to about 20%, about 1.0% to about 20%, about 2.0% to about 20%, about 3.0% to about 20%, about 4.0% to about 20%, about 5.0% to about 20%, about 6.0% to about 20%, about 7.0% to about 20%, about 8.0% to about 20%, about 9.0% to about 20%, about 10.0% to about 20%, about 11.0% to about 20%, about 12.0% to about 20%, about 13.0% to about 20%, about 14.0% to about 20%, about 15.0% to about 20%, about 16.0% to about 20%, about 17.0% to about 20%, about 18.0% to about 20%, or about 19.0% to about 20% of the weight of the moiety $[(RO_a)(QO_b)]$. In one embodiment, the weight percentage of the component $(RO_a)$ is about 0.5%, about 1.0%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 30%, about 35%, about 40%, about 45%, about 50%, about 55%, about 60%, about 65%, about 70%, about 75%, about 80%, about 85%, about 90%, about 95%, about 99%, or about 99.9% of the weight of the moiety $[(RO_a)(QO_b)]$.

In an eleventh embodiment, the present disclosure provides a catalyst according to the first through tenth embodiments, wherein the weight percentage of the component $(RO_a)$ is about 5% to about 20% of the weight of the moiety $[(RO_a)(QO_b)]$. The definitions of the remaining variables are provided in the first through tenth embodiments and other embodiments described herein of the first aspect. In one embodiment, the weight percentage of the component $(RO_a)$ is about 5% to about 15%, about 5% to about 10%, about 5% to about 8%, or about 5% to about 6%.

In a twelfth embodiment, the present disclosure provides a catalyst according to the first through eleventh embodiments, wherein the weight percentage of the component $(RO_a)$ is about 15% of the weight of the moiety $[(RO_a)(QO_b)]$. The definitions of the remaining variables are provided in the first through eleventh embodiments and other embodiments described herein of the first aspect.

In a thirteenth embodiment, the present disclosure provides a catalyst according to the first through twelfth embodiments, wherein Z is a zeolite. The definitions of the remaining variables are provided in the first through twelfth embodiments and other embodiments described herein of the first aspect.

In a fourteenth embodiment, the present disclosure provides a catalyst according to the first through thirteenth embodiments, wherein the zeolite has a silica to alumina molar ratio of about 0.1 to about 2000. The definitions of the remaining variables are provided in the first through thirteenth embodiments and other embodiments described herein of the first aspect. In one embodiment, the zeolite has a silica to alumina molar ratio of about 0.5 to about 2000, about 1.0 to about 2000, about 5 to about 2000, about 10 to about 2000, about 15 to about 2000, about 20 to about 2000, about 25 to about 2000, about 25 to about 1500, about 25 to about 1000, about 25 to about 500, about 25 to about 400, about 25 to about 300, about 25 to about 200, about 25 to about 100, about 25 to about 95, about 25 to about 90, about 25 to about 85, about 25 to about 80, about 25 to about 75, about 25 to about 70, about 25 to about 65, about 25 to about 60, about 25 to about 55, about 25 to about 50, about 25 to about 45, about 25 to about 40, about 25 to about 35, about 25 to about 34, about 25 to about 33, about 25 to about 32, about 25 to about 31, about 25 to about 30, about 26 to about 30, about 27 to about 30, about 28 to about 30, or about 29 to about 30. In one embodiment, the zeolite has a silica to alumina molar ratio of about 0.1, about 0.5, about 1.0, about 5, about 10, about 15, about 20, about 25, about 30, about 35, about 40, about 45, about 50, about 55, about 60, about 65, about 70, about 75, about 80, about 85, about 90, about 95, about 100, about 200, about 300, about 400, about 500, about 600, about 700, about 800, about 900, about 1000, about 1100, about 1200, about 1300, about 1400, about 1500, about 1600, about 1700, about 1800, about 1900, or about 2000.

In a fifteenth embodiment, the present disclosure provides a catalyst according to the first through fourteenth embodiments, wherein the silica to alumina molar ratio of the zeolite is in the range of about 5 to about 60. The definitions of the remaining variables are provided in the first through fourteenth embodiments and other embodiments described herein of the first aspect. In one embodiment, the silica to alumina molar ratio of the zeolite is in the range of about 10 to about 60, about 15 to about 60, about 20 to about 60, about 25 to about 60, about 30 to about 60, about 35 to about 60, about 40 to about 60, about 45 to about 60, about 50 to about 60, or about 55 to about 60.

In a sixteenth embodiment, the present disclosure provides a catalyst according to the first through fifteenth embodiments, wherein the silica to alumina molar ratio of the zeolite is in the range of about 25 to about 40. The definitions of the remaining variables are provided in the first through fifteenth embodiments and other embodiments described herein of the first aspect. In one embodiment, the silica to alumina molar ratio of the zeolite is about 20, about 21, about 22, about 23, about 24, about 25, about 26, about 27, about 28, about 29, about 30, about 31, about 32, about 33, about 34, about 35, about 36, about 37, about 38, about 39, or about 40.

In a seventeenth embodiment, the present disclosure provides a catalyst according to the first through sixteenth embodiments, wherein the silica to alumina molar ratio of the zeolite is 30. The definitions of the remaining variables are provided in the first through sixteenth embodiments and other embodiments described herein of the first aspect.

In an eighteenth embodiment, the present disclosure provides a catalyst according to the first through seventeenth embodiments, wherein the zeolite has a pore size of about 3 to about 8 Å. The definitions of the remaining variables are provided in the first through seventeenth embodiments and other embodiments described herein of the first aspect. In one embodiment, the zeolite has a pore size of less than 2000 Å. In another embodiment, the zeolite has a pore size of about 1 Å to about 1900 Å, about 1 Å to about 1800 Å, about 1 Å to about 1700 Å, about 1 Å to about 1600 Å, about 1 Å to about 1500 Å, about 1 Å to about 1400 Å, about 1 Å to about 1300 Å, about 1 Å to about 1200 Å, about 1 Å to about 1100 Å, about 1 Å to about 1000 Å, about 1 Å to about 900 Å, about 1 Å to about 800 Å, about 1 Å to about 700 Å, about 1 Å to about 600 Å, about 1 Å to about 500 Å, about 1 Å to about 400 Å, about 1 Å to about 300 Å, about 1 Å to about 200 Å, about 1 Å to about 100 Å, about 1 Å to about 90 Å, about 1 Å to about 80 Å, about 1 Å to about 70 Å, about 1 Å to about 60 Å, about 1 Å to about 50 Å, about 1 Å to about 40 Å, about 1 Å to about 30 Å, about 1 Å to about 20 Å, about 1 Å to about 15 Å, about 1 Å to about 10 Å, about 1 Å to about 9 Å, about 1 Å to about 8 Å, about 2 Å to about 8 Å, about 3 Å to about 8 Å, about 4 Å to about 8 Å, about 5 Å to about 8 Å, about 6 Å to about 8 Å, or about 7 Å to about 8 Å.

In a nineteenth embodiment, the present disclosure provides a catalyst according to the first through eighteenth embodiments, wherein the zeolite has a pore size of 6-8 Å. The definitions of the remaining variables are provided in the first through eighteenth embodiments and other embodiments described herein of the first aspect.

In a twentieth embodiment, the present disclosure provides a catalyst according to the first through nineteenth embodiments, wherein the zeolite has a pore size of 5-6 Å. The definitions of the remaining variables are provided in the first through nineteenth embodiments and other embodiments described herein of the first aspect.

In a twenty-first embodiment, the present disclosure provides a catalyst according to the first through thirteenth embodiments, wherein the zeolite is selected from the group consisting of HY, ZSM-5, HBEA, HMOR, SAPO-11, SAPO-34, and MCM-22. The definitions of the remaining variables are provided in the first through thirteenth embodiments and other embodiments described herein of the first aspect.

In a twenty-second embodiment, the present disclosure provides a catalyst according to the first through thirteenth embodiments, wherein the zeolite is selected from the group consisting of HY(30), HY(60), HY(80), HZSM-5 (23), HBEA(25), and HMOR (20); wherein the number in the parenthesis indicates the silica to alumina molar ratio. The definitions of the remaining variables are provided in the first through thirteenth embodiments and other embodiments described herein of the first aspect.

In a twenty-third embodiment, the present disclosure provides a catalyst according to the twenty-second embodiment, wherein the zeolite is HY(30). The definitions of the remaining variables are provided in the twenty-second embodiment and other embodiments described herein of the first aspect.

In a twenty-fourth embodiment, the present disclosure provides a catalyst according to the first through twelfth embodiments, wherein Z is a mesoporous material. The definitions of the remaining variables are provided in the first through twelfth embodiments and other embodiments described herein of the first aspect.

In a twenty-fifth embodiment, the present disclosure provides a catalyst according to the twenty-fourth embodiment, wherein the mesoporous material is a mesoporous zeolite.

The definitions of the remaining variables are provided in the twenty-fourth embodiment and other embodiments described herein of the first aspect.

In a twenty-sixth embodiment, the present disclosure provides a catalyst according to the twenty-fifth embodiment, wherein the mesoporous zeolite comprises a crystal wall. The definitions of the remaining variables are provided in the twenty-fifth embodiment and other embodiments described herein of the first aspect.

In a twenty-seventh embodiment, the present disclosure provides a catalyst according to the twenty-sixth embodiment, wherein the crystal wall comprises a zeolite. The definitions of the remaining variables are provided in the twenty-sixth embodiment and other embodiments described herein of the first aspect.

In a twenty-eighth embodiment, the present disclosure provides a catalyst according to the twenty-seventh embodiment, where the catalyst is selected from the group consisting of microporous HY, microporous ZSM-5, microporous HBEA, and microporous HMOR. The definitions of the remaining variables are provided in the twenty-seventh embodiment and other embodiments described herein of the first aspect.

In a twenty-ninth embodiment, the present disclosure provides a catalyst according to the twenty-fifth embodiment, wherein the mesoporous zeolite is HY(30)-M1, HY(30)-M2, HY(30)-M3, HY(30)-M4, mesoporous HY, mesoporous HZSM-5, mesoporous HBEA, mesoporous SAPO-11, mesoporous SAPO-34, and mesoporous MCM-22. The definitions of the remaining variables are provided in the twenty-fifth embodiment and other embodiments described herein of the first aspect.

In a thirtieth embodiment, the present disclosure provides a catalyst according to the twenty-fourth embodiment, wherein the mesoporous material is an amorphous mesoporous material. The definitions of the remaining variables are provided in the twenty-fourth embodiment and other embodiments described herein of the first aspect.

In a thirty-first embodiment, the present disclosure provides a catalyst according to the thirtieth embodiment, wherein the amorphous mesoporous material comprises an amorphous wall. The definitions of the remaining variables are provided in the thirtieth embodiment and other embodiments described herein of the first aspect.

In a thirty-second embodiment, the present disclosure provides a catalyst according to the thirtieth embodiment, wherein the amorphous mesoporous material is selected from the group consisting of Al-MCM-41, Al-SBA-15, Al-SBA-16, Al-MCM-48, and Al-HMS. The definitions of the remaining variables are provided in the thirtieth embodiment and other embodiments described herein of the first aspect.

In a thirty-third embodiment, the present disclosure provides a catalyst according to the thirty-second embodiment, wherein the amorphous mesoporous material is Al-MCM-41. The definitions of the remaining variables are provided in the thirty-second embodiment and other embodiments described herein of the first aspect.

2. Process for Hydrocracking Plastics

In the second aspect, the present disclosure provides a process for hydrocracking plastics to form a fuel, a lubricant, or a mixture thereof.

In the first embodiment, the present disclosure provides a process for hydrocracking plastics, comprising contacting the plastics with a catalyst in a hydrogen atmosphere at a temperature between about 150° C. and about 800° C. for a period of time between about 0.1 hours and about 120 hours to form a fuel, a lubricant, or a mixture thereof; wherein the catalyst is represented by Formula (I):

$$X[(RO_a)(QO_b)]*Z \qquad (I), \text{ and}$$

wherein
X is a noble metal selected from the group consisting of ruthenium, rhodium, palladium, osmium, iridium, and platinum;
R and Q independently are a transition metal;
O is oxygen;
a and b independently are 1, 2, 3, or 4;
Z is a zeolite or a mesoporous material; and
the symbol "*" means that the moiety $X[(RO_a)(QO_b)]$ and the moiety Z are mechanically mixed; wherein the weight percentage of the moiety Z is about 1% to about 99% of the total weight of the catalyst.

In a second embodiment, the present disclosure provides a process according to the first embodiment, wherein the plastics is selected from the group consisting of polyolefins, polyesters, polyethers, acrylic and methacrylic polymers, polyacetals, polyamides, polyurethanes, polyvinyl chloride, fluorinated polymers, polysulfide, polysulfones, copolymers, and a mixture thereof. The definitions of the remaining variables are provided in the first embodiment of the second aspect.

In a third embodiment, the present disclosure provides a process according to the first or the second embodiment, wherein the plastics is selected from the group consisting of polyethylene (PE), polypropylene (PP), polystyrene (PS), layered PP-PE-PS composites, and a mixture thereof. The definitions of the remaining variables are provided in the first embodiment or the second embodiment of the second aspect.

In a fourth embodiment, the present disclosure provides a process according to the first through third embodiments, wherein the plastics is selected from the group consisting of high-density polyethylene (HDPE), low-density polyethylene (LDPE), isotactic polypropylene, polystyrene (PS), and a mixture thereof. The definitions of the remaining variables are provided in the first through third embodiments of the second aspect.

In a fifth embodiment, the present disclosure provides a process according to the first through fourth embodiments, wherein the hydrogen atmosphere is at a pressure between about 1 bar to about 200 bar. The definitions of the remaining variables are provided in the first through fourth embodiments of the second aspect. In one embodiment, the hydrogen atmosphere is at a pressure between about 1 bar to about 190 bar, about 1 bar to about 180 bar, about 1 bar to about 170 bar, about 1 bar to about 160 bar, about 1 bar to about 150 bar, about 1 bar to about 140 bar, about 1 bar to about 130 bar, about 1 bar to about 120 bar, about 1 bar to about 110 bar, about 1 bar to about 100 bar, about 1 bar to about 90 bar, about 1 bar to about 80 bar, about 1 bar to about 70 bar, about 1 bar to about 60 bar, about 1 bar to about 50 bar, about 1 bar to about 40 bar, about 1 bar to about 30 bar, about 1 bar to about 20 bar, about 1 bar to about 10 bar, about 10 bar to about 20 bar, about 20 bar to about 30 bar, about 30 bar to about 40 bar, 40 bar to about 50 bar, 50 bar to about 60 bar, 60 bar to about 70 bar, 70 bar to about 80 bar, 80 bar to about 90 bar, 90 bar to about 100 bar, 100 bar to about 110 bar, 110 bar to about 120 bar, 120 bar to about 130 bar, 130 bar to about 140 bar, 140 bar to about 150 bar, 150 bar to about 160 bar, 170 bar to about 180 bar, 180 bar to about 190 bar, or 190 bar to about 200 bar. In one embodiment, the hydrogen atmosphere is at a pressure of about 1 bar, about 5 bar, about 10 bar, about 15 bar, about 20 bar, about 25 bar, about 30 bar, about 35 bar, about 40 bar, about 45 bar, about 50 bar, about 55 bar, about 60 bar, about 65 bar, about 70 bar, about 75 bar, about 80 bar, about 85 bar, about 90 bar, about 95 bar, about 100 bar, about 105 bar, about 110 bar, about 115 bar, about 120 bar, about 125 bar, about 130 bar, about 135 bar, about 140 bar, about 145 bar, about 150 bar, about 155 bar, about 160 bar, about 165 bar, about 170 bar, about 175 bar, about 180 bar, about 185 bar, about 190 bar, about 195 bar, or about 200 bar.

In a sixth embodiment, the present disclosure provides a process according to the first through fifth embodiments, wherein the hydrogen atmosphere is at a pressure between about 20 bar to about 40 bar. The definitions of the remaining variables are provided in the first through fifth embodiments of the second aspect.

In a seventh embodiment, the present disclosure provides a process according to the first through sixth embodiments, wherein the hydrogen atmosphere is at a pressure of about 30 bar. The definitions of the remaining variables are provided in the first through sixth embodiments of the second aspect.

In an eighth embodiment, the present disclosure provides a process according to the first through seventh embodiments, wherein the temperature is between about 150° C. and about 400° C. The definitions of the remaining variables are provided in the first through seventh embodiments and the other embodiments described herein of the second aspect. In one embodiment, the temperature is between about 150° C. and about 750° C., about 150° C. and about 700° C., about 150° C. and about 650° C., about 150° C. and about 600° C., about 150° C. and about 550° C., about 150° C. and about 500° C., about 150° C. and about 450° C., about 150° C. and about 400° C., about 150° C. and about 350° C., about 150° C. and about 300° C., about 150° C. and about 250° C., or about 150° C. and about 200° C. In one embodiment, the temperature is about 150° C., about 200° C., about 250° C., about 300° C., about 350° C., about 400° C., about 450° C., about 500° C., about 550° C., about 600° C., about 650° C., about 700° C., about 750° C., or about 800° C. In one embodiment, the reaction temperature is reached by using a microwave. In one embodiment, microwave absorbing material is applied to accelerate the heating rate. In one embodiment, the microwave absorbing material is SiC. In one embodiment, the microwave absorbing materials are physically mixed with plastics. In one embodiment, the plastics is the grinded plastics. In one embodiment, the size of the physical mixtures of microwave absorbing materials and the grinded plastics is from 100 μm to 5 mm. In one embodiment, the microwave absorbing materials is in pellet form or structured form including, but not limited to, monoliths, foams, and 3D printed structures. In one embodiment, the catalyst is deposited as a thin coating on the microwave absorbing materials. In one embodiment, the thickness of the catalyst layer is in the range between about 100 nm to about 100 μm. In one embodiment, the catalyst, microwave absorbing material, and plastic are physically mixed. In one embodiment, the catalyst and the plastic are physically mixed inside the structured microwave absorbing material.

In one embodiment, the catalyst and the microwave absorbing materials are submerged inside the polymer matrix of the plastics via foaming using supercritical $CO_2$. Other exfoliation methods can be used to embed the catalyst (microwave absorbing material with catalyst coating) into the plastics. In one embodiment, the catalyst and the microwave absorbing materials are hot pressed to embed the microwave absorbing materials inside the polymer film. In one embodiment, the plastic is first melted in contact with a microwave absorbing material and then comes in contact with the catalyst and a microwave absorbing material for depolymerization to occur.

In a ninth embodiment, the present disclosure provides a process according to the first through eighth embodiments, wherein the temperature is between about 190° C. and about 300° C. The definitions of the remaining variables are provided in the first through eighth embodiments and the other embodiments described herein of the second aspect. In one embodiment, the temperature is about 190° C., about 200° C., about 210° C., about 220° C., about 230° C., about 240° C., about 250° C., about 260° C., about 270° C., about 280° C., about 290° C., or about 300° C.

In a tenth embodiment, the present disclosure provides a process according to the first through ninth embodiments, wherein the temperature is between about 200° C. and about 270° C. The definitions of the remaining variables are provided in the first through ninth embodiments and the other embodiments described herein of the second aspect.

In an eleventh embodiment, the present disclosure provides a process according to the first through tenth embodiments, wherein the temperature is about 250° C. The definitions of the remaining variables are provided in the first through tenth embodiments and the other embodiments described herein of the second aspect.

In a twelfth embodiment, the present disclosure provides a process according to the first through eleventh embodiments, wherein the period of time is between about 0.5 hour and about 96 hours. The definitions of the remaining variables are provided in the first through eleventh embodiments and the other embodiments described herein of the second aspect. In one embodiment, the period of time is between about 0.5 hour and about 90 hours, about 0.5 hour and about 84 hours, about 0.5 hour and about 78 hours, about 0.5 hour and about 72 hours, about 0.5 hour and about 66 hours, about 0.5 hour and about 60 hours, about 0.5 hour and about 54 hours, about 0.5 hour and about 48 hours, about 0.5 hour and about 42 hours, about 0.5 hour and about 36 hours, about 0.5 hour and about 30 hours, about 0.5 hour and about 24 hours, about 0.5 hour and about 18 hours, about 0.5 hour and about 12 hours, about 0.5 hour and about 10 hours, about 0.5 hour and about 8 hours, about 0.5 hour and about 6 hours, about 0.5 hour and about 4 hours, about 0.5 hour and about 2 hours, or about 0.5 hour and about 1 hour. In one embodiment, the period of time is about 0.5 hour, about 1.0 hour, about 2 hours, about 4 hours, about 6 hours, about 8 hours, about 10 hours, about 12 hours, about 14 hours, about 16 hours, about 18 hours, about 20 hours, about 22 hours, about 24 hours, about 26 hours, about 28 hours, about 30 hours, about 32 hours, about 34 hours, about 36 hours, about 38 hours, about 40 hours, about 42 hours, about 44 hours, about 46 hours, about 48 hours, about 50 hours, about 52 hours, about 54 hours, about 56 hours, about 58 hours, about 60 hours, about 62 hours, about 64 hours, about 66 hours, about 68 hours, about 70 hours, about 72 hours, about 74 hours, about 76 hours, about 78 hours, about 80 hours, about 82 hours, about 84 hours, about 86 hours, about 88 hours, about 90 hours, about 92 hours, about 94 hours, or about 96 hours.

In a thirteenth embodiment, the present disclosure provides a process according to the first through twelfth embodiments, wherein the period of time is between about 1.5 hours and about 8 hours. The definitions of the remaining variables are provided in the first through twelfth embodiments and the other embodiments described herein of the second aspect. In one embodiment, the period of time is between about 1.5 hours and about 7 hours, about 1.5 hours and about 6 hours, about 1.5 hours and about 5 hours, about 1.5 hours and about 4 hours, about 1.5 hours and about 3 hours, or about 1.5 hours and about 2 hours.

In a fourteenth embodiment, the present disclosure provides a process according to the first through thirteenth embodiments, wherein the period of time is between about 2 hours and about 6 hours. The definitions of the remaining variables are provided in the first through thirteenth embodiments and the other embodiments described herein of the second aspect. In one embodiment, the period of time is between about 2 hours and about 5 hours, about 2 hours and about 4 hours, or about 2 hours and about 3 hours.

In a fifteenth embodiment, the present disclosure provides a process according to the first through fourteenth embodiments, wherein the period of time is about 2 hours. The definitions of the remaining variables are provided in the first through fourteenth embodiments and the other embodiments described herein of the second aspect.

In a sixteenth embodiment, the present disclosure provides a process according to the first through fifteenth embodiments, wherein the fuel is a mixture of liquid hydrocarbons. The definitions of the remaining variables are provided in the first through fifteenth embodiments and the other embodiments described herein of the second aspect.

In a seventeenth embodiment, the present disclosure provides a process according to the first through sixteenth embodiments, wherein the fuel is selected from the group consisting of gasoline, jet fuel, kerosene fuel, diesel fuel, and a mixture thereof. The definitions of the remaining variables are provided in the first through sixteenth embodiments and the other embodiments described herein of the second aspect.

In an eighteenth embodiment, the present disclosure provides a process according to the first through seventeenth embodiments, wherein the fuel has a carbon number distribution between about 5 and about 22. The definitions of the remaining variables are provided in the first through seventeenth embodiments and the other embodiments described herein of the second aspect. In one embodiment, the fuel has a carbon number distribution between about 5 and about 21, about 5 and about 20, about 5 and about 19, about 5 and about 18, about 5 and about 17, about 5 and about 16, about 5 and about 15, about 5 and about 14, about 5 and about 13, about 5 and about 12, about 5 and about 11, about 5 and about 10, about 5 and about 9, about 5 and about 8, about 5 and about 7, or about 5 and about 6. In one embodiment, the fuel has a carbon number distribution of about 5, about 6, about 7, about 8, about 9, about 10, about 11, about 12, about 13, about 14, about 15, about 16, about 17, about 18, about 19, about 20, about 21, or about 22. In some embodiments, the product distribution in terms of carbon number can be tuned by changing the characteristics of the acid catalyst, such as the acid site strength and the pore size and shape, with non-microporous materials giving rise to heavier fuels.

In a nineteenth embodiment, the present disclosure provides a process according to the first through eighteenth embodiments, wherein the fuel has a carbon number distribution between 5 and 12. The definitions of the remaining variables are provided in the first through eighteenth embodiments and the other embodiments described herein of the second aspect. In one embodiment, the fuel has a carbon number distribution between about 6 and about 12, about 7 and about 12, about 8 and about 12, about 9 and about 12, about 10 and about 12, or about 11 and about 12.

In a twentieth embodiment, the present disclosure provides a process according to the first through nineteenth embodiments, wherein the fuel has a carbon number distribution between 9 and 22. The definitions of the remaining variables are provided in the first through nineteenth embodiments and the other embodiments described herein of the second aspect. In one embodiment, the fuel has a carbon number distribution between about 10 and about 22, about 11 and about 22, about 12 and about 22, about 13 and about 22, about 14 and about 22, about 15 and about 22, about 16 and about 22, about 17 and about 22, about 18 and about 22, about 19 and about 22, about 20 and about 22, or about 21 and about 22.

In a twenty-first embodiment, the present disclosure provides a process according to the first through twentieth embodiments, wherein the lubricant is a mixture of hydrocarbons having a carbon number distribution between about 13 and about 60. The definitions of the remaining variables are provided in the first through twentieth embodiments and the other embodiments described herein of the second aspect. In one embodiment, the lubricant is a mixture of hydrocarbons having a carbon number distribution between about 13 and about 58, about 13 and about 56, about 13 and about 54, about 13 and about 52, about 13 and about 50, about 13 and about 48, about 13 and about 46, about 13 and about 44, about 13 and about 42, about 13 and about 40, about 13 and about 38, about 13 and about 36, about 13 and about 34, about 13 and about 32, about 13 and about 30, about 13 and about 28, about 13 and about 26, about 13 and about 24, about 13 and about 22, about 13 and about 20, about 13 and about 18, about 13 and about 16, or about 13 and about 14. In one embodiment, the lubricant is a mixture of hydrocarbons having a carbon number distribution of about 13, about 15, about 17, about 19, about 21, about 23, about 25, about 27, about 29, about 31, about 33, about 35, about 37, about 39, about 41, about 43, about 45, about 47, about 49, about 51, about 53, about 55, about 57, or about 59.

In a twenty-second embodiment, the present disclosure provides a process according to the first through twenty-first embodiments, wherein the weight ratio between the plastics and the catalyst is about 200:1 to about 1:1. The definitions of the remaining variables are provided in the first through twenty-first embodiments and the other embodiments described herein of the second aspect. In one aspect, the weight ratio between the plastics and the catalyst is about 190:1 to about 1:1, about 180:1 to about 1:1, about 170:1 to about 1:1, about 160:1 to about 1:1, about 150:1 to about 1:1, about 140:1 to about 1:1, about 130:1 to about 1:1, about 120:1 to about 1:1, about 110:1 to about 1:1, about 100:1 to about 1:1, about 90:1 to about 1:1, about 80:1 to about 1:1, about 70:1 to about 1:1, about 60:1 to about 1:1, about 50:1 to about 1:1, about 40:1 to about 1:1, about 30:1 to about 1:1, about 20:1 to about 1:1, about 10:1 to about 1:1, about 9:1 to about 1:1, about 8:1 to about 1:1, about 7:1 to about 1:1, about 6:1 to about 1:1, about 5:1 to about 1:1, about 4:1 to about 1:1, about 3:1 to about 1:1, or about 2:1 to about 1:1. In one embodiment, the weight ratio between the plastics and the catalyst is about 200:1, about 190:1, about 180:1, about 170:1, about 160:1, about 150:1, about 140:1, about 130:1, about 120:1, about 110:1, about 100:1, about 90:1, about 80:1, about 70:1, about 60:1, about 50:1, about 40:1, about 30:1, about 20:1, about 10:1, about 9:1, about 8:1, about 7:1, about 6:1, about 5:1, about 4:1, about 3:1, about 2:1, or 1:1.

In a twenty-third embodiment, the present disclosure provides a process according to the first through twenty-second embodiments, wherein the weight ratio between the plastics and the catalyst is about 30:1 to about 5:1. The definitions of the remaining variables are provided in the first through twenty-second embodiments and the other embodiments described herein of the second aspect. In one embodiment, the weight ratio between the plastics and the catalyst is about 30:1 to about 10:1, about 30:1 to about 15:1, about 30:1 to about 20:1, or about 30:1 to about 25:1.

In a twenty-fourth embodiment, the present disclosure provides a process according to the first through twenty-third embodiments, wherein the weight ratio between the plastics and the catalyst is about 20:1 to about 8:1. The definitions of the remaining variables are provided in the first through twenty-third embodiments and the other embodiments described herein of the second aspect. In one embodiment, the weight ratio between the plastics and the catalyst is about 18:1 to about 8:1, about 16:1 to about 8:1, about 14:1 to about 8:1, about 12:1 to about 8:1, about 10:1 to about 8:1, or about 9:1 to about 8:1.

In a twenty-fifth embodiment, the present disclosure provides a process according to the first through twenty-fourth embodiments, wherein the weight ratio between the plastics and the catalyst is about 10:1. The definitions of the remaining variables are provided in the first through twenty-fourth embodiments and the other embodiments described herein of the second aspect.

In a twenty-sixth embodiment, the present disclosure provides a process according to the first through twenty-fifth embodiments, wherein the conversion of the plastics is at least about 85%. The definitions of the remaining variables are provided in the first through twenty-fifth embodiments and the other embodiments described herein of the second aspect. In one embodiment, the conversion of the plastics is at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99%.

In a twenty-seventh embodiment, the present disclosure provides a process according to the first through twenty-sixth embodiments, wherein the conversion of the plastics is at least about 90%. The definitions of the remaining variables are provided in the first through twenty-sixth embodiments and the other embodiments described herein of the second aspect.

In a twenty-eighth embodiment, the present disclosure provides a process according to the first through twenty-seventh embodiments, wherein the conversion of the plastics is at least about 95%. The definitions of the remaining variables are provided in the first through twenty-seventh embodiments and the other embodiments described herein of the second aspect.

In a twenty-ninth embodiment, the present disclosure provides a process according to the first through twenty-eighth embodiments, wherein the conversion of the plastics is at least about 99%. The definitions of the remaining variables are provided in the first through twenty-eighth embodiments and the other embodiments described herein of the second aspect.

In a thirtieth embodiment, the present disclosure provides a process according to the first through twenty-ninth embodiments, wherein the yield of the fuel, the lubricant, or the mixture thereof is at least about 60%. The definitions of the remaining variables are provided in the first through twenty-ninth embodiments and the other embodiments described herein of the second aspect. In one embodiment, the yield of the fuel, the lubricant, or the mixture thereof is at least about 65%, at least about 70%, at least about 75%, at least about 80%, at least about 85%, at least about 90%, at least about 95%, or at least about 99%.

In a thirty-first embodiment, the present disclosure provides a process according to the first through thirtieth embodiments, wherein the yield of the fuel, the lubricant, or the mixture thereof is at least about 75%. The definitions of the remaining variables are provided in the first through thirtieth embodiments and the other embodiments described herein of the second aspect.

In a thirty-second embodiment, the present disclosure provides a process according to the first through thirty-first embodiments, wherein the yield of the fuel, the lubricant, or the mixture thereof is at least about 85%. The definitions of the remaining variables are provided in the first through thirty-first embodiments and the other embodiments described herein of the second aspect.

In one embodiment, the present disclosure provides a process according to the first through thirty-second embodiments, wherein the catalyst is defined in the first aspect and the embodiments described therein. The definitions of the remaining variables are provided in the first through thirty-second embodiments and the other embodiments described herein of the second aspect.

3. Definitions

To facilitate understanding of the disclosure set forth herein, a number of terms are defined below. Unless defined otherwise, all technical and scientific terms used herein have the same meaning as commonly understood by one of ordinary skill in the art to which this disclosure belongs. In case of conflict, the present application including the definitions will control. Unless otherwise required by context, singular terms shall include pluralities and plural terms shall include the singular. All publications, patents and other references mentioned herein are incorporated by reference in their entireties for all purposes as if each individual publication or patent application were specifically and individually indicated to be incorporated by reference.

Although methods and materials similar or equivalent to those described herein can be used in practice or testing of the present disclosure, suitable methods and materials are described below. The materials, methods and examples are illustrative only and are not intended to be limiting. Other features and advantages of the disclosure will be apparent from the detailed description and from the claims.

In this specification and the appended claims, the singular forms "a," "an" and "the" include plural referents unless the context clearly dictates otherwise. The terms "a" (or "an"), as well as the terms "one or more," and "at least one" can be used interchangeably herein. In certain aspects, the term "a" or "an" means "single." In other aspects, the term "a" or "an" includes "two or more" or "multiple."

The term "about" is used herein to mean approximately, roughly, around, or in the regions of. When the term "about" is used in conjunction with a numerical range, it modifies that range by extending the boundaries above and below the numerical values set forth. In general, the term "about" is used herein to modify a numerical value above and below the stated value by a variance of 10 percent, up or down (higher or lower).

The term "hydrocracking" as used herein generally refers to the catalytic cracking of heavy hydrocarbon molecules into smaller alkanes, olefins and aromatics, the cracking being performed in the presence of at least one catalyst and hydrogen. The pressure may be from 10 to 160 bar in an atmosphere rich in hydrogen, such as from 80% to 100%. The temperature may be from 200° to 450° C. The materials catalytically active in hydrocracking are active for both the cracking of carbon-carbon bonds and the hydrogenation of unsaturated molecules present in the feed and products. Such material catalytically active in hydrocracking typically comprises an acidic refractory support often mixed with a carrier matrix and either noble elemental metal from IUPAC group 8, 9 or 10, such as Pt or Pd, or a sulfided metal from IUPAC group 6, often promoted by a further sulfided metal from IUPAC group 8, 9 or 10, typically Mo or W in combination with Ni or Co.

The term "plastics" as used herein generally refers to a material based on organic macromolecules composed mainly of carbon and hydrogen, such as polyolefins, or also comprising oxygen, such as polyesters, polyethers, acrylic and methacrylic polymers, polyacetals, or macromolecules also comprising nitrogen, such as polyamides and polyurethanes, or macromolecules also comprising halogens, such as polyvinyl chloride and fluorinated polymers, or sulfur-containing macromolecules, such as polysulfides and polysulfones, or copolymers obtained by combining various monomers, such as acrylonitrile-butadiene copolymers (ABS) and like. In one embodiment, the plastics used in the present disclosure are recycled plastics, i.e. recovered from household and/or industrial waste by appropriate mechanical selection and grinding operations, as is known in the art. It therefore also contains various additives and other components used in the production of the articles from which the recycled plastic derives. In one embodiment, the carbon content of the plastic used is greater than 45% by weight, greater than 60% by weight, or greater than 70% by weight. In one embodiment, the hydrogen content of the plastic used is greater than 5% by weight, greater than 8% by weight, or greater than 12% by weight. In one embodiment, the oxygen content is less than 20% by weight, less than 10% by weight, or less than 7% by weight. In one embodiment, the content of nitrogen, halogens and sulfur is overall less than 3% by weight, less than 2% by weight, or it is less than 0.5% by weight.

The term "fuel" as used herein generally refers to materials meeting certain specifications or a blend of components that are useful in formulating fuel compositions but, by themselves, do not meet all of the required specifications for a fuel.

The term "gasoline" as used herein generally refers to a composition containing at least predominantly $C_5$-$C_{12}$ hydrocarbons. In one embodiment, gasoline or gasoline boiling range components is further defined to refer to a composition containing at least predominantly $C_5$-$C_{12}$ hydrocarbons and further having a boiling range from about 100° F. to up to 330° F. In an alternative embodiment, gasoline or gasoline boiling range components is defined to refer to a composition containing at least predominantly $C_5$-$C_{12}$ hydrocarbons, having a boiling range from about 100° F. to up to 330° F., and further defined to meet ASTM standard D4814.

The term "jet fuel" as used herein generally refers to kerosene or naphtha-type fuel cuts, and/or military-grade jet fuel compositions. "Kerosene-type" jet fuel (including Jet A and Jet A-1) has a carbon number distribution between about 8 and about 16. Jet A and Jet A-1 typically have a flash point of at least approximately 38° C., an auto ignition temperature of approximately 210° C., a freeze point less than or equal to approximately −40° C. for Jet A and −47° C. for Jet A-1, a density of approximately 0.8 g/cc at 15° C., and an energy density of approximately 42.8-43.2 MJ/kg. "Naphtha-type" or "wide-cut" jet fuel (including Jet B) has a carbon number distribution between about 5 and about 15. Jet B typically comprises a flash point below approximately 0° C., an auto ignition temperature of approximately 250° C., a freeze point of approximately −51° C., a density of approximately 0.78 g/cc, and an energy density of approximately 42.8-43.5 MJ/kg. "Military grade" jet fuel refers to the Jet Propulsion or "JP" numbering system (JP-1, JP-2, JP-3, JP-4, JP-5, JP-6, JP-7, JP-8, etc.). Military grade jet fuels may comprise alternative or additional additives to have higher flash points than Jet A, Jet A-1, or Jet B in order to cope with heat and stress endured during supersonic flight.

The term "kerosene fuel" as used herein generally refers to the petroleum fraction having a boiling point range of about 180-270° C. or of about 190-260° C.

The term "diesel fuel" as used herein generally refers to a hydrocarbon composition having a carbon number distribution between about 8 and about 25. Diesel fuels typically have a specific gravity of approximately 0.82-1.08 at 15.6° C. (60° F.) based on water having a specific gravity of 1 at 60° F. Diesel fuels typically comprise a distillation range between approximately 180-340° C. (356-644° F.). Additionally, diesel fuels have a minimum cetane index number of approximately 40.

The term "lubricant" as used herein generally refers to a mixture of hydrocarbons having a carbon number distribution between about 13 and about 60.

The term "noble metal" as used herein generally refers to metals that are highly resistant to corrosion and/or oxidation. In one embodiment, Group VIII noble metals include ruthenium (Ru), osmium (Os), rhodium (Rh), iridium (Ir), palladium (Pd), and platinum (Pt).

The term "transition metal" as used herein generally refers to any element in the d-block of the periodic table, including Groups 3 to 12.

The term "zeolite" as used herein generally refers to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001). In one embodiment, the zeolite is a microporous, aluminosilicate minerals of which pore size is less than 2 nm.

The term "mesoporous material" as used herein generally refers to solids that contain pores with free diameters of 2-50 nm.

The term "mesoporous zeolite" as used herein generally refers to a zeolite that is both microporous and mesoporous. In one embodiment, the mesoporous zeolite means a zeolite whose microporous zeolite crystals have, in conjunction with microporosity, internal cavities of nanometric size (mesoporosity), which are readily identifiable by means of transmission electron microscopy (TEM), as described, for example, in U.S. Pat. No. 7,785,563: observation by transmission electron microscopy (TEM) makes it possible to check whether the zeolite crystals are filled zeolite crystals (i.e. not mesoporous) or aggregates of filled zeolite crystals or mesoporous crystals or aggregates of mesoporous crystals.

The term "carbon number distribution" as used herein generally refers to the range of compounds present in a composition, wherein each compound is defined by the number of carbon atoms present. As a non-limiting example, a naphtha-type jet fuel typically comprises a distribution of hydrocarbon compounds wherein a majority of those compounds have between 5 and 15 carbon atoms each. A kerosene-type jet fuel typically comprises a distribution of hydrocarbon compounds wherein a majority of those compounds have between 8 and 16 carbon atoms each. A diesel fuel typically comprises a distribution of hydrocarbon compounds wherein a majority of those compounds have between 8 and 25 carbon atoms each.

The term "microwave absorbing material" as used herein generally refers to any material with a high enough dielectric or magnetic loss factor that can be heated in a microwave heating apparatus at a sufficiently fast rate and to a high enough temperature. In one embodiment, the microwave absorbing material refers to materials such as iron or carbon that are electrically conductive and therefore are not good absorbers by themselves, but are good microwave absorbers when added in powdered form as fillers to nonconductive materials, such as epoxies or plastics.

EXAMPLES

General Materials and Methods
a. Zeolite Samples

Zeolites HY(30), HY(60), HY(80), HZSM-5 (23), HBEA (25) and HMOR (20) were purchased from Zeolyst International. Al-MCM-41 (Si/Al=39.5) was obtained from Sigma-Aldrich. All samples were prepared by calcining at 550° C. for 4 h (2° C./min ramp). For all the zeolite samples, the $SiO_2/Al_2O_3$ ratio is indicated in parenthesis.

b. Feedstocks

Low-density polyethylene ($M_w$ 150,000), high density polyethylene, isotactic polypropylene ($M_w$ 250,000), and polystyrene ($M_w$ 35,000) were purchased from Sigma-Aldrich. The 4 oz LDPE and 8 oz HDPE bottles were obtained from SP Scienceware, and the HDPE T-shirt transparent bags were purchased from ULINE.

c. Catalyst Characterization

X-ray diffraction pattern of powdered calcined samples were measured on Brucker D8 diffractometer in 0-0 geometry with step size 0.05°, 3 s per point. Porosity and surface area were investigated by N2 adsorption at −196° C. on Micromeritics ASAP 2020 instrument. Before adsorption, samples were pretreated in vacuum at 300° C. overnight (ramping rate 2°/min). Chemical composition was determined on Rigaku Supermini 200 WDXRF. XPS spectra were recorder on Thermo Fisher K-Alpha instrument with Al $K_\alpha$ radiation. TEM images were acquired on an Aberration Corrected Scanning/Transmission Electron Microscope, JEOL NEOARM TEM/STEM.

CO chemisorption on $Pt/WO_3/ZrO_2$ was conducted using the pulse technique on Micromeritics AutoChem II instrument. DRIFT spectra of adsorbed CO were recorded on a Nicolet 8700 spectrometer with liquid nitrogen cooled MCT detector with a Praying Mantis in situ flow cell equipped with KBr windows. Before adsorption, the sample was heated in 20% $H_2$/He flow for 2 h at 250° C., then purged with pure He for 0.5 h and cooled to room temperature. CO (Praxair, 99.99%) was dosed onto the sample using a 6-port valve with calibrated loop.

FTIR transmission spectra of adsorbed pyridine followed by pyridine thermodesorption were recorded in a homemade pyrex flow cell equipped with KBr windows. Before measurements, the sample was reduced ex situ in a flow furnace for 2 h at 250° C. in 50% $H_2$/He flow and left for 3 months in a sealed vial. Then the sample was pressed in a self-supported wafer (1.27 $cm^2$, 40 bar/$cm^2$ pressure), placed in a reactor sample holder and heated in flow of pure He or in flow of 20% $H_2$/He to 250° C. (ramping rate 2° C./min) with 2 h dwell at that temperature and 1 h extra flushing with pure He. Then, the temperature was reduced to 150° C. and the sample was treated with pyridine vapor by passing He flow though the bubbler filled with liquid pyridine (Sigma-Aldrich, 99.8%). After saturation, the sample was flushed with pure He for 30 min, then the temperature was increased with 10° C./min rate to 350° C. in constant flow of He, and spectra were recorded every 1 min. Integration and peaks deconvolution were done using the Omnic 8.2 software.

TGA of fresh and spent catalysts was conducted on Discovery TGA (TA instruments) in flow of air (50 ml/min) in 25-700° C. range with heating rate 10° C./min.

d. Product Analysis

Gas samples from the headspace of the Parr reactor were charged in a Tedlar gas sampling bag and analyzed with GC-FID (Agilent HP-Plot GC column). Response factors and retention times for $C_{1-6}$ saturated hydrocarbons were estimated by injection of standard calibration mixtures.

The residual oil-mixture was combined with approx. 20 mL of $CH_2Cl_2$ (ACS grade, Fisher Scientific) containing 20 mg of octacosane (n-$C_{28}$, TCI chemicals, ≥98.0%) as an internal standard. This mixture was separated from the catalyst and the unreacted solid by filtration (GE Whatman, 100 μm) and analyzed by GC-FID (Agilent HP-1 column) and GC-MS (Agilent DB-1 column). Calibration coefficients were measured by injection of the analytical standards.

The yield of the product group with $i^{th}$ carbons was calculated as:

$$Y_i = \frac{n_i}{n_{initial}},$$

where $n_i$ is the number of carbon atoms in the product group with $i^{th}$ carbons, while $n_{initial}$ is the number of carbon atoms in the initial polymer. The yield of solid residue was estimated gravimetrically.

The selectivity of the product group with $i^{th}$ carbons was calculated as:

$$S_i = \frac{Y_i}{\sum Y_j},$$

where $\Sigma_j^Y$ corresponds to the total yield of all reaction products.

The carbon balance in all experiments was higher than 80%.

e. Catalyst Regeneration

To recover activity, the catalyst blend was filtered with 100 mL of $CH_2Cl_2$ (ACS grade, Fisher Scientific), dried in air overnight at 110° C., calcined at 500° C. for 3 h (2° C./min ramp) in static air, and then reduced in a 100 mL/min equimolar flow of H2 and He gas at 250° C. for 2 h (10° C./min ramp).

Example 1. Preparation of Pt/WO$_3$/ZrO$_2$

WO$_3$/ZrO$_2$ supports were prepared by impregnating zirconia (IV) hydroxide (Zr(OH) 4, Aldrich, 97%) with an ammonium metatungstate hydrate ((NH$_4$)$_6$H$_2$W$_{12}$O$_{40}$·XH$_2$O, Aldrich, 99.99%) solution, dried in air at 110° C., and then calcined at 800° C. for 3 h (2° C./min ramp) in static air. The ZrO$_2$ supports were loaded with 15 wt % WO$_3$. The Pt/WO$_3$/ZrO$_2$ catalysts were synthesized by impregnating the WO$_3$/ZrO$_2$ supports with a chloroplatinic acid (H$_2$PtCl$_6$, Aldrich, 8 wt % in H$_2$O) solution, dried at 110° C., and then calcined at 500° C. for 3 h (2° C./min ramp) in static air. The catalysts were loaded with 0.5 wt % Pt.

Example 2. Catalyst Pre-Treatment and Reaction Tests

Pt/WO$_3$/ZrO$_2$ was reduced prior to reaction in a 100 mL/min equimolar flow of H$_2$ and He gas at 250° C. for 2 h (10° C./min ramp). Reduced Pt/WO$_3$/ZrO$_2$ and HY zeolite, at specified mass ratios, was mechanically mixed with 2.0 g of plastic in a 50 mL stainless-steel Parr reactor using a 0.7 mL stir bar. The mass ratio of LDPE to catalyst blend was maintained at 10 for all tests. After mixing, the Parr reactor was sealed and purged six times with H$_2$ at 15 bar, charged to 30 bar for reaction, and then heated to reaction temperature. Reactions were maintained for specified time intervals and then were quickly quenched by plunging the Parr vessel in a water-ice bath and flowing house air over the lid. Products were collected once the temperature of the reactor fell below 10° C.

Example 3. Microwave (MW)-enabled Plastic Depolymerization in the Melt 0.5 g of SiC (a. SiC pellets 0.51 mm, b. SiC pellets 0.13 mm, c. SiC with 3D structure) and the 0.5 g of grinded plastics were placed in a container. 50 mg of the catalyst was physically mixed with SiC. The mixture was heated to melt by a microwave.

FIG. 1a-f show the temperature field over various forms of SiC. Size, structure, shape and material composition can be tuned to get rapid, volumetric, and uniform heating at much shorter times than conventional systems (FIG. 1g). Upon heating, the polymer melt (images in FIG. 1h) fills the macropores and reacts on the catalyst.

Figure 2B:
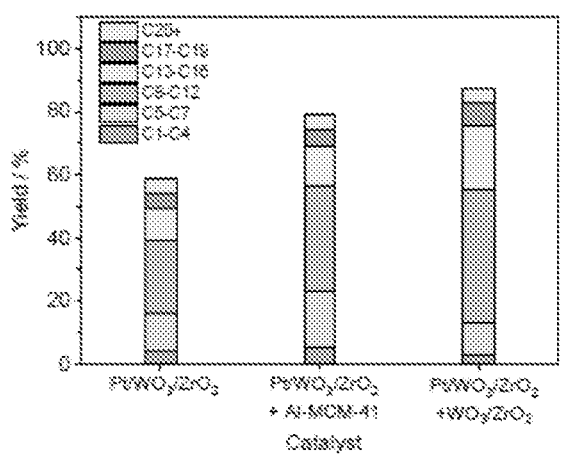
FIG. 2b shows the product distribution of the reaction of LDPE to fuels and lubricants with three different catalysts.
Figure 2C:
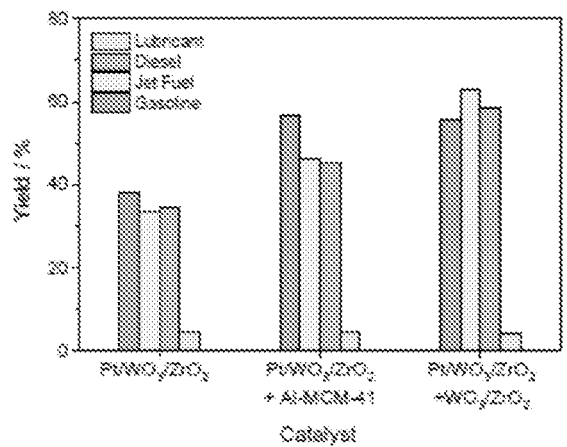
FIG. 2c shows the fuel and lubricant distribution of the reaction of LDPE to fuels and lubricants with three different catalysts.
Figure 3A:
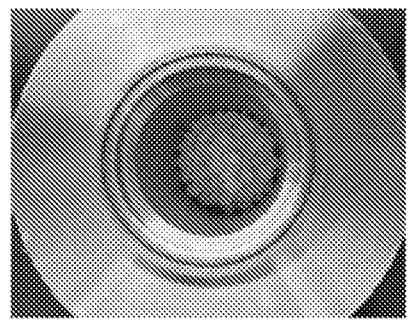
FIG. 3a shows the reaction vessel with polyethylene.
Figure 3B:
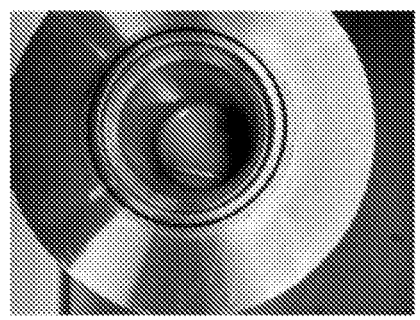
FIG. 3b shows that white solid polyethylene is not completely consumed after it reacts over Pt/WO$_3$/ZrO$_2$.
Figure 3C:
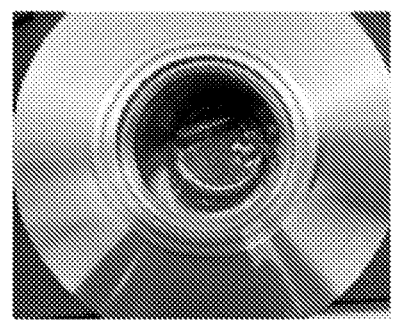
FIG. 3c shows that white solid polyethylene is completely converted to transparent liquid after it reacts over Pt/WO$_3$/ZrO$_2$*Al-MCM-41.

Example 4. Conversion of LDPE to Fuels and Lubricants 2 g of low-density polyethylene (LDPE) was mixed with three different catalysts and heated to 250° C. for 12 hours under 30 bar of hydrogen. The reaction conversion and product distribution are summarized in Table 1 below and FIG. 2 a-c.

TABLE 1

| Catalyst | Conversion Rate | Liquid Oil Yield |
| --- | --- | --- |
| Pt/WO$_3$/ZrO$_2$ (0.1 g) | 79% | 59% |
| Pt/WO$_3$/ZrO$_2$ * Al-MCM-41 (0.1 g + 0.1 g) | 97% | 81% (57% gasoline) |
| Pt/WO$_3$/ZrO$_2$ * WO$_3$/ZrO$_2$ (0.1 g + 0.1 g) | 97% | 89% (63% jet fuel and 59% diesel) |

It is surprising to find that catalysts Pt/WO$_3$/ZrO$_2$*Al-MCM-41 and Pt/WO$_3$/ZrO$_2$*WO$_3$/ZrO$_2$ substantially increase the catalyst activity while Pt/WO$_3$/ZrO$_2$ alone shows low activity for plastics conversion.

Figure 4A:
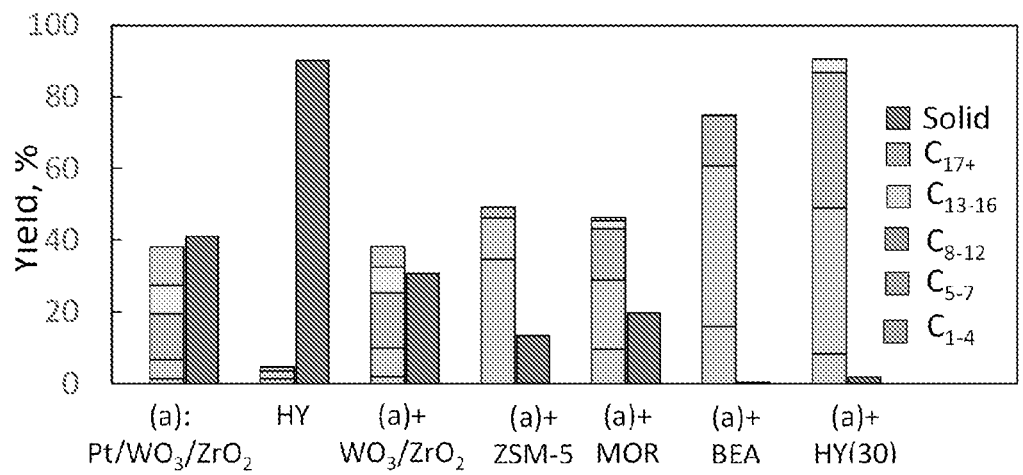
FIG. 4a shows depolymerization of LDPE over Pt/WO$_3$/ZrO$_2$ with various solid acid catalysts for 2 h.

Example 5. Synergy Effect between Pt/WO$_3$/ZrO$_2$ and Various Solid Acid Catalysts Depolymerization of LDPE was performed by mixing 2 g of low-density polyethylene (LDPE) with seven different catalysts separately and heated to 250° C. for 2 hours under 30 bar of hydrogen. The reaction conversion and product distribution were summarized in Table 2 below and FIG. 4a. Pt/WO$_3$/ZrO$_2$ alone showed low activity for LDPE conversion in the melt phase at 250° C., giving linear and branched alkanes (an average of 9 and 91%, respectively) (FIG. 4a-b) with a broad carbon number distribution centered at ca. C$_{10}$. Pure HY(30) zeolite, under the same reaction conditions, showed very little LDPE conversion with extensive coking leading to 91% solid residue (FIG. 4a). The catalysts Pt/WO$_3$/ZrO$_2$*ZSM-5, Pt/WO$_3$/ZrO$_2$*MOR, Pt/WO$_3$/ZrO$_2$*BEA, and Pt/WO$_3$/ZrO$_2$*MOR demonstrated the improved catalytic activities.

Figure 4B:
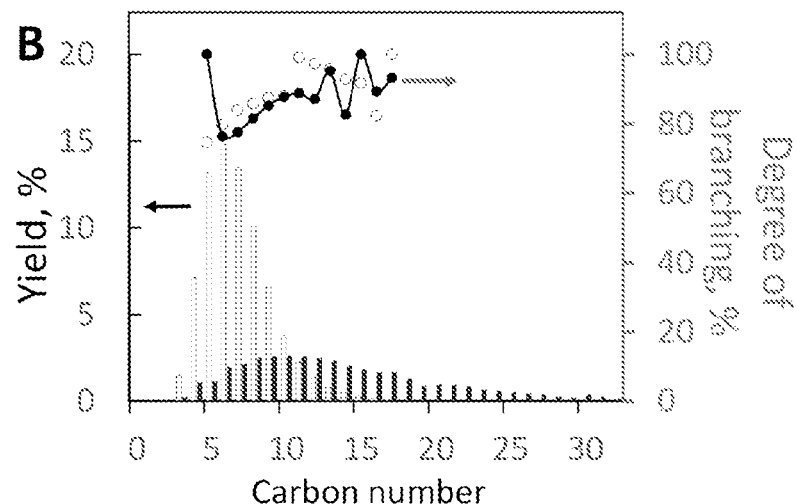
FIG. 4b shows product yields and degree of isomerization by carbon number for pure Pt/WO$_3$/ZrO$_2$ (black) and Pt/WO$_3$/ZrO$_2$ mixed with HY(30) in a 1:1 mass ratio (yellow).

Specifically, mechanical blending HY(30) zeolite with Pt/WO$_3$/ZrO$_2$ increased substantially the catalyst activity with only 7% unconverted solid residue after 2 h (FIG. 4A). Furthermore, the product distribution became narrower and shifted to gasoline-range hydrocarbons (FIG. 4B). The results suggested a strong synergy between Pt/WO$_3$/ZrO$_2$ and HY(30) zeolite.

TABLE 2

| Solid acid | Si/Al ratio | Yield of solid, % | Selectivity, % | | | | | Yield of gasoline ($C_{5-12}$), % | Yield of diesel ($C_{9-22}$), % |
| --- | --- | --- | --- | --- | --- | --- | --- | --- | --- |
| | | | $C_{1-4}$ | $C_{5-7}$ | $C_{8-12}$ | $C_{13-16}$ | $C_{17+}$ | | |
| Zeolites | | | | | | | | | |
| HZSM-5 | 11.5 | 13.4 | 70.3 | 23.3 | 6.3 | 0.0 | 0.0 | 12.8 | 1.4 |
| HMOR | 10.0 | 20.1 | 20.5 | 41.6 | 30.9 | 5.0 | 2.0 | 32.0 | 11.9 |
| HBEA | 12.5 | 0.0 | 21.3 | 60.0 | 18.7 | 0.0 | 0.0 | 56.7 | 6.2 |
| HY(30) | 15.8 | 6.4 | 9.3 | 52.1 | 28.5 | 2.0 | 0.2 | 72.5 | 19.5 |
| Solid acids | | | | | | | | | |
| Al-MCM-41 | 39.5 | 68.3 | 8.9 | 28.3 | 41.8 | 16.0 | 4.9 | 10.7 | 8.5 |
| WO$_3$/ZrO$_2$ | — | 31.3 | 5.0 | 21.2 | 40.0 | 18.7 | 15.1 | 22.5 | 23.3 |
| Al-MCM-41$^a$ | 39.5 | 3.1 | 6.3 | 28.4 | 39.2 | 14.7 | 11.4 | 56.8 | 45.2 |
| WO$_3$/ZrO$_2^a$ | — | 2.6 | 2.9 | 15.3 | 46.8 | 22.3 | 12.7 | 55.8 | 58.7 |

Reaction conditions used for catalytic reactions listed in Table 2 were: 250° C., 30 bar H$_2$, 2.0 g LDPE, 0.1 g Pt/WO$_3$/ZrO$_2$, 0.1 g solid acid, reaction time 2 h (except for data in 'a', which was conducted for 12 h).

The data in Table 2 showed that Pt/WO$_3$/ZrO$_2$*HY(30) gave gasoline-range product ($C_{5-12}$) with ~72% yield in a single step while the jet/diesel fuel ($C_{8-22}$ alkanes) yield was 54% and 73% using Al-MCM-41 and WO$_3$/ZrO$_2$ acid catalysts in 12 hours at 250° C., respectively.

Furthermore, Table 2 showed that HY favored a gasoline-range product and HZSM-5 C$_1$-4 gas products. HBEA gave higher gas products than HY.

Example 6. SiO$_2$/Al$_2$O$_3$ Ratio Effect

Figure 5:
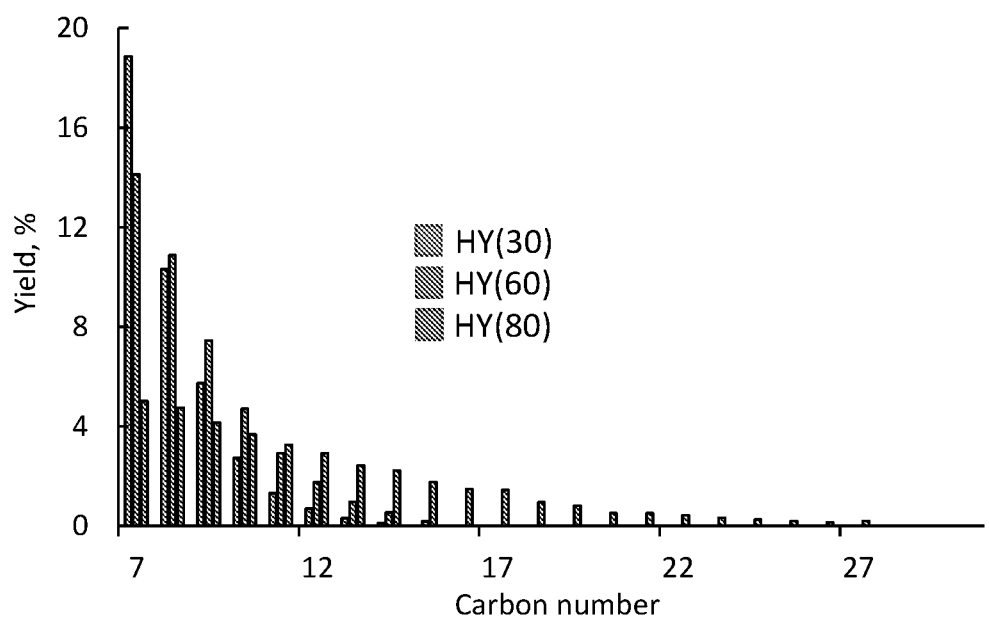
FIG. 5 shows product distribution by carbon number over Pt/WO$_3$/ZrO$_2$ mixed with HY zeolite samples of different SiO$_2$/Al$_2$O$_3$ ratios.

Product distribution by carbon number over Pt/WO$_3$/ZrO$_2$ mixed with HY zeolite samples of different SiO$_2$/Al$_2$O$_3$ ratio is demonstrated in FIG. 5. Reaction conditions were: 250° C., 4 h, 30 bar H$_2$. FIG. 5 shows that the conversion decreased as SiO$_2$/Al$_2$O$_3$ ratios increased. Furthermore, lower SiO$_2$/Al$_2$O$_3$ shows higher selectivity to gasoline ranged alkanes, while higher SiO$_2$/Al$_2$O$_3$ shows better selectivity to jet fuel and diesel fuel ranged alkanes.

Characterization data (Table 3) shows that HY zeolites have very similar micropore volumes and mesopore surface areas. The only major difference corresponds to acid site density. Over less acidic HY zeolites, the yield of C$_{13}$+ hydrocarbons increases with a concomitant decline in the C$_{5-7}$ yield due to slower cracking. In addition to acidity, introduction of mesopores is vital for shifting the product distribution.

TABLE 3

| Sample | Si/Al$_{bulk}$ | Si/Al$_{lat}$* | S$_{BET}$, m$^2$/g | V$_{tot}$, cm$^3$/g | V$_{micro}$, cm$^3$/g | S$_{meso}$, m$^2$/g | Brønsted acid sites, μmol/g** | Lewis acid sites, μmol/g** |
| --- | --- | --- | --- | --- | --- | --- | --- | --- |
| HY(30) | 15.8 | 14.4 | 570 | 0.58 | 0.29 | 210 | 320 | 100 |
| HY(60) | 28.3 | 16.3 | 570 | 0.59 | 0.29 | 240 | 180 | 40 |
| HY(80) | 45.6 | 19.4 | 530 | 0.61 | 0.26 | 230 | 13 | 15 |

*Si/Al in zeolite lattice was calculated from XRD data;
**calculated from FTIR of adsorbed pyridine using extinction coefficients of 1.8 and 1.5 cm/μmol for Brønsted and Lewis acid sites, respectively.

Example 7. Effect of Mesoporosity

Zeolite HY(30) was immersed in NaOH solution for 30 min at 60° C. Samples are denoted according to the NaOH concentration in the initial solution:

| Sample name | NaOH concentration, M |
| --- | --- |
| M1 | 0.1 |
| M2 | 0.2 |
| M3 | 0.3 |
| M4 | 0.4 |

After treatment, the samples were filtered, extensively washed with DI water and dried overnight at 110° C. The obtained samples were further exchanged to the H-form with aqueous NH$_4$NO$_3$, followed by drying at 110° C. overnight with consecutive calcination at 550° C. for 4 h in air. No sodium impurities were found in the samples by XRF analysis.

Table 4 summarizes physico-chemical properties of desilicated HY zeolite samples.

TABLE 4

| Sample | Si/Al$_{bulk}$ | Si/Al$_{lat}^a$ | S$_{BET}$, m$^2$/g | V$_{tot}$, cm$^3$/g | V$_{micro}$, cm$^3$/g | S$_{meso}$, m$^2$/g | X, %$^b$ | Brønsted acid sites, μmol/g$^c$ | Lewis acid sites, μmol/g$^c$ |
| --- | --- | --- | --- | --- | --- | --- | --- | --- | --- |
| Parent HY (30) | 15.8 | 14.3 | 570 | 0.58 | 0.29 | 210 | 100 | 320 | 100 |

TABLE 4-continued

| Sample | Si/Al$_{bulk}$ | Si/Al$_{lat}$$^a$ | S$_{BET}$, m$^2$/g | V$_{tot}$, cm$^3$/g | V$_{micro}$, cm$^3$/g | S$_{meso}$, m$^2$/g | X, %$^b$ | Brønsted acid sites, µmol/g$^c$ | Lewis acid sites, µmol/g$^c$ |
|---|---|---|---|---|---|---|---|---|---|
| M1 | 13.9 | 21.3 | 560 | 0.59 | 0.19 | 300 | 75 | 230 | 40 |
| M2 | 15.0 | 21.8 | 540 | 0.59 | 0.20 | 320 | 73 | 200 | 50 |
| M3 | 12.8 | 10.1 | 480 | 0.53 | 0.05 | 420 | 17 | 140 | 40 |
| M4 | 10.9 | — | 360 | 0.47 | 0.00 | 380 | 0 | 50 | 10 |

$^a$Si/Al in zeolite lattice was calculated from XRD data according to (6);
$^b$crystallinity, relative to parent HY(30) sample,
$^c$calculated by FTIR of adsorbed pyridine using extinction coefficients of 1.8 and 1.5 cm/µmol for Brønsted and Lewis acid sites, respectively.

Figure 6:
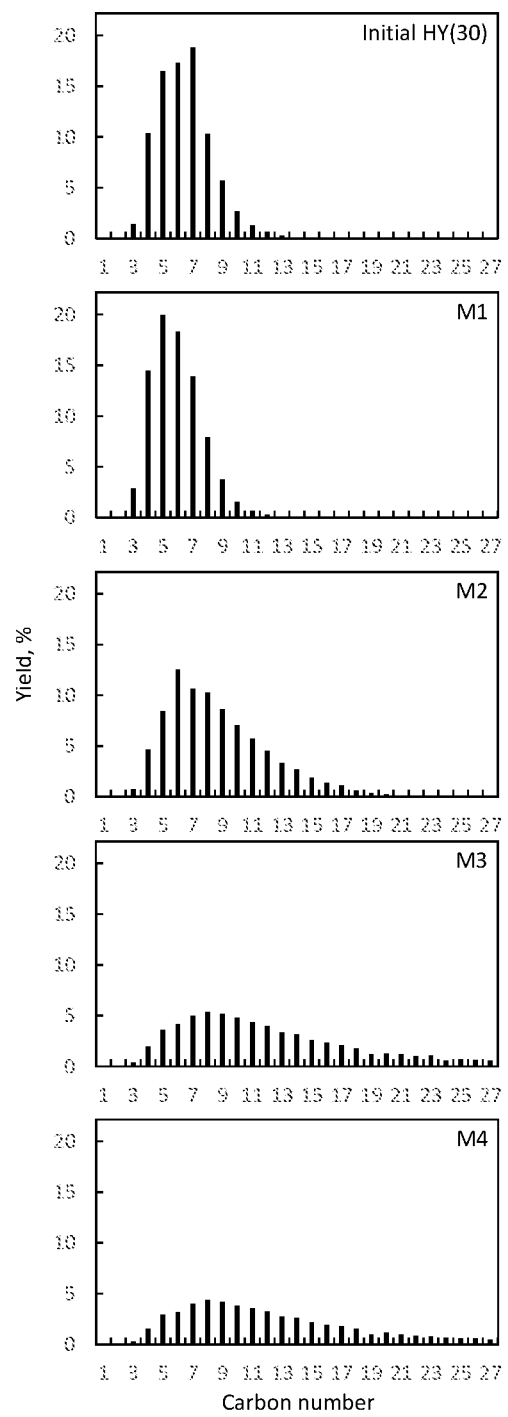
FIG. 6 shows the product yield distribution by carbon number over Pt/WO$_3$/ZrO$_2$ mixed with pristine HY(30) and desilicated zeolite samples.
Figure 7:
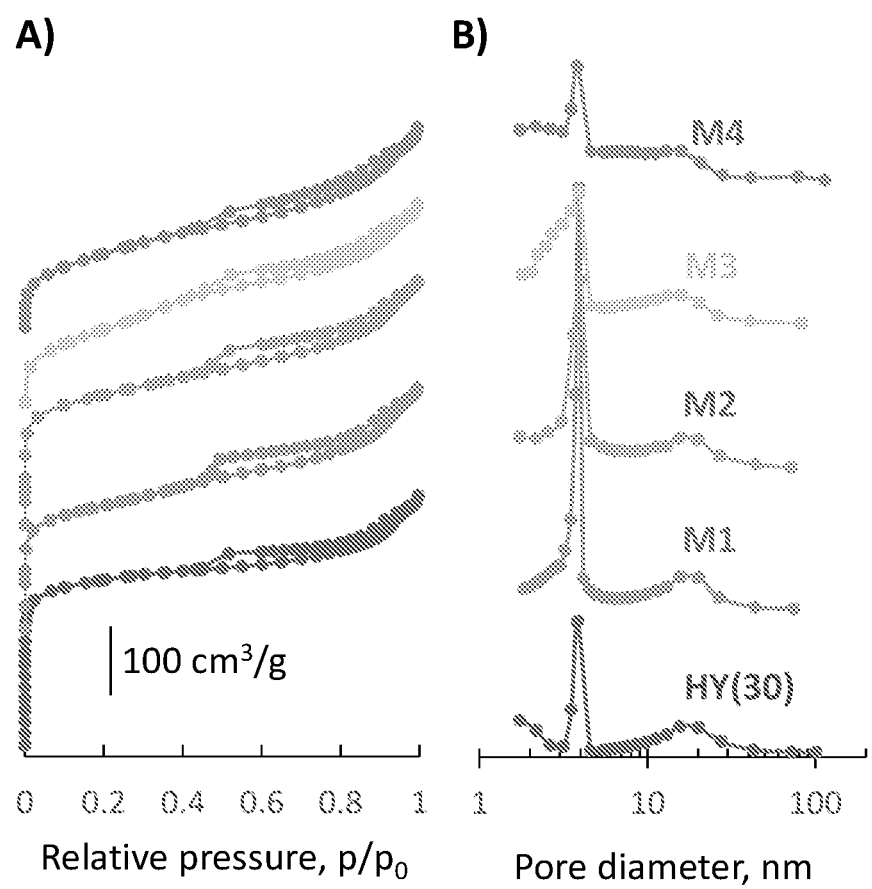
FIG. 7 shows adsorption data of desilicated HY zeolites.

FIG. 6 shows the product yield distribution by carbon number over Pt/WO$_3$/ZrO$_2$ mixed with pristine HY(30) and desilicated zeolite samples. Table 4 and FIG. 7 show that treatment with NaOH increases the mesopore volume with strong decline in crystallinity. The selectivity to gasoline-range hydrocarbons (C$_{13}$+ hydrocarbons) decreases (increases) in the order M1≥HY(30)>M2>M3, which indicates that the remaining acid sites upon desilication become weaker shifting the selectivity to higher molecular weight products.

Example 8. Hydrocracking of Different Feedstocks

Figure 8:
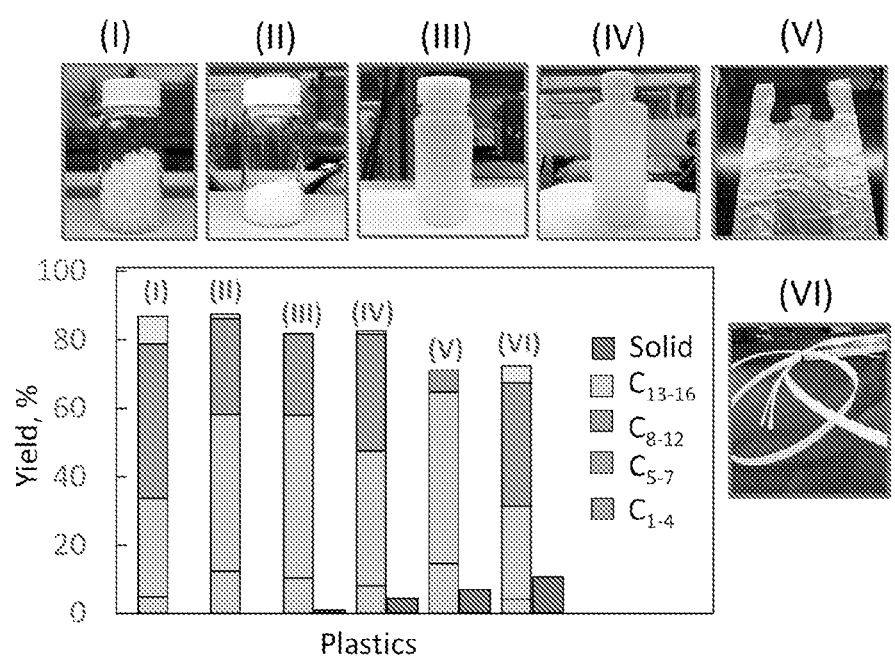
FIG. 8 shows hydrocracking of different feedstocks.

Virgin granules of LDPE, HDPE, isotactic PP, PS, tapes of mixed layered plastics, and various bottles and transparent bags were performed catalytic hydrocracking tests. FIG. 8 summarizes the yields and product distributions for six different feedstocks: (I) PP granules, (II) HDPE granules, (III) LDPE bottle, (IV) HDPE bottle, (V) HDPE bag, (VI) 45 vol % PP-45 vol % PE-10 vol % PS composite tape. The reaction conditions were: 250° C., 30 bar H$_2$, reaction time 2h for (I)-(IV), 8h for (V), 4h for (VI).

Figure 9:
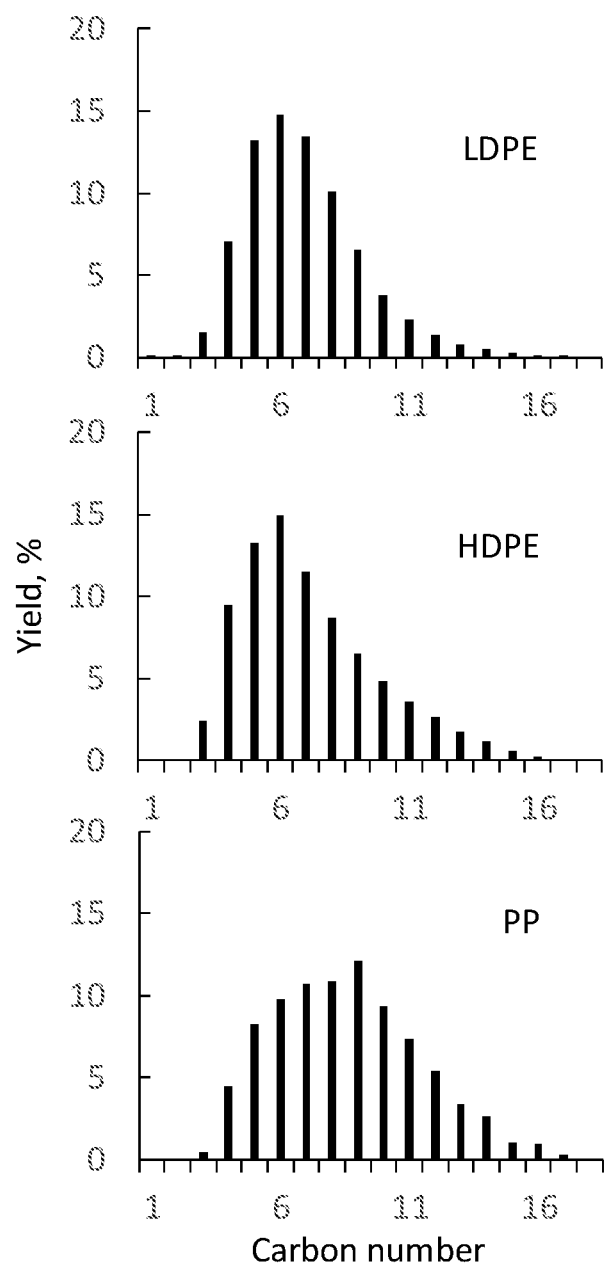
FIG. 9 shows product distribution by carbon number for different polyolefin feedstocks over Pt/WO$_3$/ZrO$_2$ mixed with HY(30) at the conditions of 250° C., 2 h, and 30 bar H2.
Figure 10:
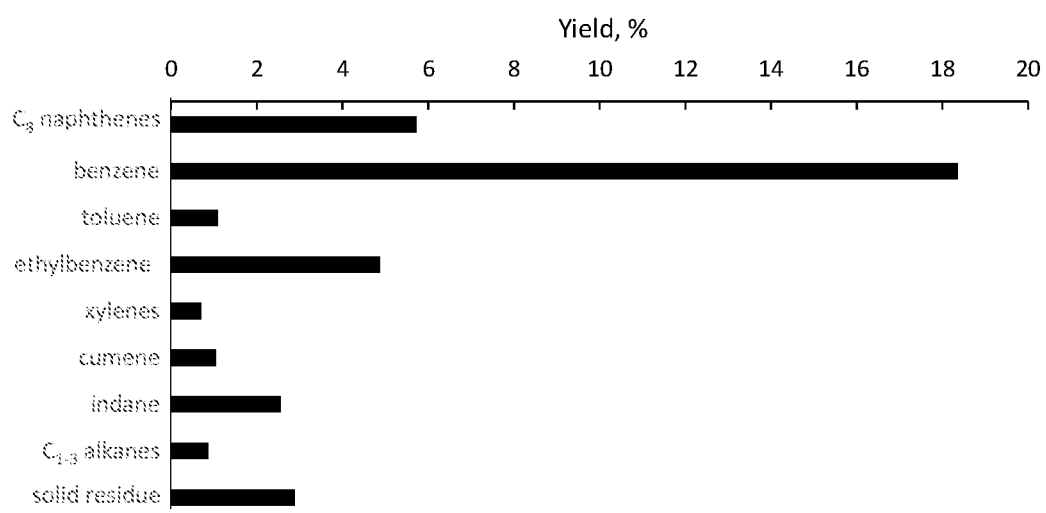
FIG. 10 shows the main product distribution of polystyrene (PS) conversion over Pt/WO$_3$/ZrO$_2$ mixed with HY(30) at the conditions of 275° C., 1 h, and 30 bar H2.

The catalyst mixture effectively converted all the plastic components, into liquid products with high yields (60-85%). FIG. 9 shows product distribution by carbon number for different polyolefin feedstocks over Pt/WO$_3$/ZrO$_2$ mixed with HY(30) at the conditions of 250° C., 2 h, and 30 bar H$_2$. It shows that HDPE and LDPE hydrocracking leads to similar product distributions while PP produces heavier hydrocarbons in the diesel range. FIG. 10 shows main product distribution of PS conversion over Pt/WO$_3$/ZrO$_2$ mixed with HY(30) at the conditions of 275° C., 1 h, and 30 bar H$_2$. Hydroconversion of PS produces mainly aromatic hydrocarbons and cyclic alkanes.

Example 9. Effect of Hydrogen Pressure

Figure 11:
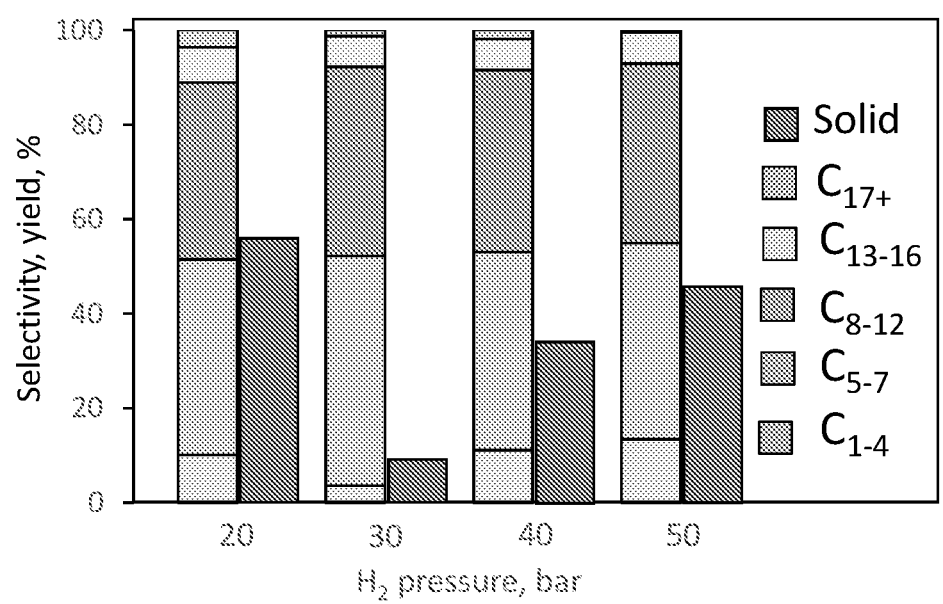
FIG. 11 shows the effect of hydrogen pressure.

The effect of hydrogen pressure was studied on 2.0 g of LDPE conversion over 0.1 g of Pt/WO$_3$/ZrO$_2$ mixed with 0.1 g of HY(30) at the conditions of conditions of 250° C. and 1 h. FIG. 11 shows that the hydrogen pressure (PH2) exhibits an optimum catalyst performance at 30 bar.

Example 10. Effect of Reaction Temperature and Time

The effect of reaction temperature and time on yields was studied on 2.0 g of LDPE conversion over 0.1 g of Pt/WO$_3$/ZrO$_2$ mixed with 0.1 g of HY(30) at the conditions of conditions of 30 bar H$_2$. The data are summarized in Table 5 below.

TABLE 5

| Reaction temperature, ° C. | Reaction time, h | Selectivity, % | | | | | Yield of solid, % |
|---|---|---|---|---|---|---|---|
| | | C$_{1-4}$ | C$_{5-7}$ | C$_{8-12}$ | C$_{13-16}$ | C$_{17+}$ | |
| 225 | 2 | 7.3 | 44.7 | 39.8 | 6.9 | 1.3 | 52.7 |
| | 4 | 9.3 | 44.6 | 38.0 | 6.6 | 1.5 | 22.6 |
| 250 | 0.5 | 11.9 | 52.7 | 31.9 | 3.4 | 0.1 | 37.0 |
| | 1 | 3.6 | 48.7 | 40.0 | 6.5 | 1.2 | 10.0 |
| | 2 | 11.4 | 54.5 | 31.7 | 2.3 | 0.1 | 4.6 |
| | 3 | 8.2 | 51.1 | 37.7 | 2.8 | 0.2 | 1.4 |
| 275 | 0.5 | 10.6 | 46.9 | 35.5 | 5.6 | 1.3 | 17.9 |
| | 1 | 4.7 | 57.0 | 35.3 | 2.8 | 0.2 | 1.9 |
| 300 | 0.5 | 8.6 | 51.9 | 34.1 | 4.9 | 0.5 | 18.9 |

In general, increasing the reaction temperature at constant reaction time enhances the yields of light C$_{5-7}$ products via consecutive cracking reactions from C$_{13+}$ to C$_{8-12}$ to C$_{5-7}$ products. Increasing reaction times at constant temperature has a similar effect. High molecular weight products are attainable at short reaction times and/or low temperatures with some compromise toward solid residue.

Example 11. Hydrocracking LDPE over Four Different Catalysts

Figure 12A:
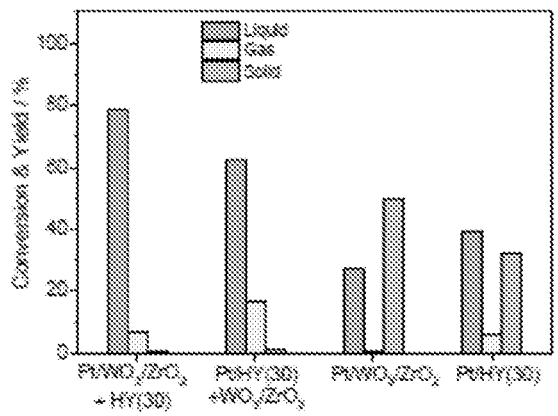
FIG. 12a-c summarizes reaction conversion and product distribution.
Figure 12B:
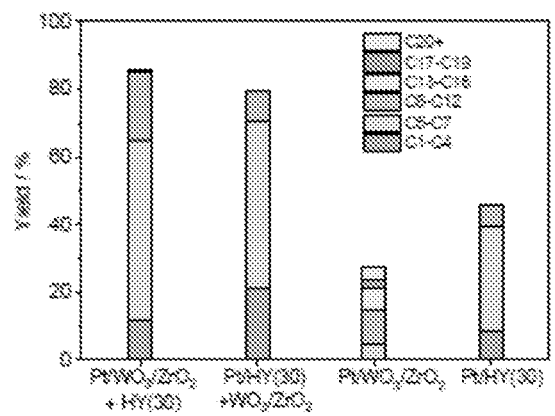
Figure 12C:
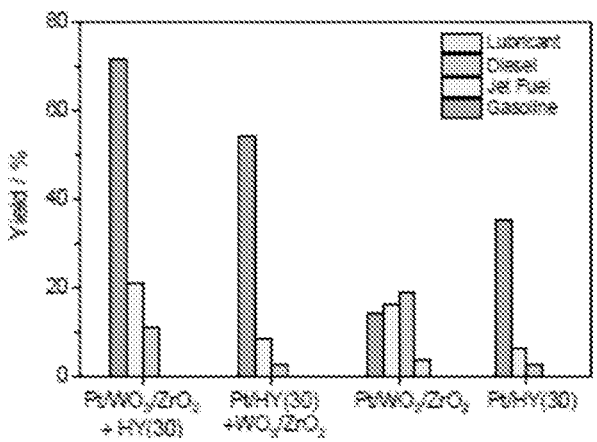

Depolymerization of LDPE was performed by mixing 2 g of low-density polyethylene (LDPE) with four different catalysts separately and heated to 250° C. for 4 hours under 30 bar of hydrogen. The reaction conversion and product distribution were summarized in FIG. 12a-c. Pt/HY shows a higher activity of C-C cracking than Pt/WO$_3$/ZrO$_2$. Catalyst Pt/WO$_3$/ZrO$_2$*HY(30) shows the best performance in converting LDPE into liquid products.

What is claimed is:
1. A process for hydrocracking plastics, comprising contacting the plastics with a catalyst in a hydrogen atmosphere at a temperature between about 150° C. and about 800° C. for a period of time between about 0.1 hours and about 120 hours to form a fuel, a lubricant, or a mixture thereof; wherein
the catalyst is represented by formula:

$$X[(RO_a)(QO_b)]*Z \qquad (I), and$$

wherein
X is a noble metal selected from the group consisting of ruthenium, rhodium, palladium, osmium, iridium, and platinum;
R and Q independently are a transition metal;
O is oxygen;
a and b independently are 1, 2, 3, or 4;
Z is a zeolite or a mesoporous material; and
the symbol "*" means that the moiety X[(RO$_a$)(QO$_b$)] and the moiety Z are mechanically mixed; wherein the weight percentage of the moiety Z is about 1% to about 99% of the total weight of the catalyst.
2. The process of claim 1, wherein
i) the plastics is selected from the group consisting of polyolefins, polyesters, polyethers, acrylic and methacrylic polymers, polyacetals, polyamides, polyurethanes, polyvinyl chloride, fluorinated polymers, polysulfide, polysulfones, copolymers, and a mixture thereof;
ii) the plastics is selected from the group consisting of polyethylene (PE), polypropylene (PP), polystyrene (PS), layered PP-PE-PS composites, and a mixture thereof; or iii) the plastics is selected from the group consisting of high-density polyethylene (HDPE), low-density polyethylene (LDPE), isotactic polypropylene, polystyrene (PS), and a mixture thereof.

3. The process of claim 1, wherein
i) the hydrogen atmosphere is at a pressure between about 1 bar to about 200 bar;
ii) the hydrogen atmosphere is at a pressure between about 20 bar to about 40 bar;
iii) the hydrogen atmosphere is at a pressure of about 30 bar;
iv) the temperature is between about 150° C. and about 400° C.;
v) the temperature is between about 190° C. and about 300° C.;
vi) the temperature is between about 200° C. and about 270° C.;
vii) the temperature is about 250° C.;
viii) the period of time is between about 0.5 hour and about 96 hours;
ix) the period of time is between about 1.5 hours and about 8 hours;
x) the period of time is between about 2 hours and about 6 hours; and/or
xi) the period of time is about 2 hours.

4. The process of claim 1, wherein
i) the fuel is a mixture of liquid hydrocarbons;
ii) the fuel is selected from the group consisting of gasoline, jet fuel, kerosene fuel, diesel fuel, and a mixture thereof;
iii) the fuel has a carbon number distribution between about 5 and about 22;
iv) the fuel has a carbon number distribution between 5 and 12;
v) the fuel has a carbon number distribution between 9 and 22; or
vi) the lubricant is a mixture of hydrocarbons having a carbon number distribution between about 13 and about 60.

5. The process of claim 1, wherein
i) the weight ratio between the plastics and the catalyst is about 200:1 to about 1:1;
ii) the weight ratio between the plastics and the catalyst is about 30:1 to about 5:1;
iii) the weight ratio between the plastics and the catalyst is about 20:1 to about 8:1; or
iv) the weight ratio between the plastics and the catalyst is about 10:1.

6. The process of claim 1, wherein
i) the conversion of the plastics is at least about 85%;
ii) the conversion of the plastics is at least about 90%;
iii) the conversion of the plastics is at least about 95%; or
iv) the conversion of the plastics is at least about 99%.

7. The process of claim 1, wherein
i) the yield of the fuel, the lubricant, or the mixture thereof is at least about 60%;
ii) the yield of the fuel, the lubricant, or the mixture thereof is at least about 75%; or
iii) the yield of the fuel, the lubricant, or the mixture thereof is at least about 85%.

8. The process of claim 1, wherein
i) X is a noble metal selected from the group consisting of rhodium, palladium, and platinum; or
ii) X is platinum.

9. The process of claim 1, wherein
i) R and Q are independently selected from a group consisting of tungsten, nickel, iron, cobalt, molybdenum, zinc, copper, manganese, chromium, titanium, vanadium, and zirconium; or
ii) R and Q are independently selected from a group consisting of tungsten, molybdenum, chromium, titanium, and zirconium.

10. The process of claim 9, wherein
R is tungsten;
a is 3;
Q is zirconium; and
b is 2.

11. The process of claim 1, wherein
i) the weight percentage of the component X is about 0.01% to about 50% of the weight of the moiety $X[(RO_a)(QO_b)]$;
ii) the weight percentage of the component X is about 0.3% to about 5% of the weight of the moiety $X[(RO_a)(QO_b)]$; or
iii) the weight percentage of the component X is about 0.5% of the weight of the moiety $X[(RO_a)(QO_b)]$.

12. The process of claim 1, wherein
i) the weight percentage of the component $(RO_a)$ is about 0.5% to about 99.9% of the weight of the moiety $[(RO_a)(QO_b)]$;
ii) the weight percentage of the component $(RO_a)$ is about 5% to about 20% of the weight of the moiety $[(RO_a)(QO_b)]$; or
iii) the weight percentage of the component $(RO_a)$ is about 15% of the weight of the moiety $[(RO_a)(QO_b)]$.

13. The process of claim 1, wherein
i) Z is a zeolite; or
ii) Z is a mesoporous material.

14. The process of claim 13, wherein
i) the zeolite has a silica to alumina molar ratio of about 0.1 to about 2000;
ii) the zeolite has a pore size of 5-8 Å;
iii) the zeolite has a pore size of 6-8 Å;
iv) the zeolite has a pore size of 5-6;
v) the zeolite is selected from the group consisting of HY, ZSM-5, HBEA, HMOR, SAPO-11, SAPO-34, and MCM-22;
vi) the zeolite is selected from the group consisting of HY(30), HY(60), HY(80), HZSM-5 (23), HBEA(25), and HMOR (20); wherein the number in the parenthesis indicates the silica to alumina molar ratio; or
vii) the zeolite is HY(30).

15. The process of claim 14, wherein
i) the silica to alumina molar ratio of the zeolite is in the range of about 25 to about 60;
ii) wherein the silica to alumina molar ratio of the zeolite is in the range of about 25 to about 40; or
iii) wherein the silica to alumina molar ratio of the zeolite is about 30.

16. The process of claim 13, wherein
i) the mesoporous material is a mesoporous zeolite;
ii) the mesoporous material is selected from the group consisting of microporous HY, microporous ZSM-5, microporous HBEA, and microporous HMOR; or
iii) the mesoporous material is an amorphous mesoporous material.

17. The process of claim 16, wherein
i) the mesoporous zeolite comprises a crystal wall; or
ii) the mesoporous zeolite is HY(30)-M1, HY(30)-M2, HY(30)-M3, HY(30)-M4, mesoporous HY, mesoporous HZSM-5, mesoporous HBEA, mesoporous SAPO-11, mesoporous SAPO-34, or mesoporous MCM-22.

18. The process of claim 17, wherein the crystal wall comprises a zeolite.

19. The process of claim 16, wherein
i) the amorphous mesoporous material comprises an amorphous wall;
ii) the amorphous mesoporous material is selected from the group consisting of Al-MCM-41, Al-SBA-15, Al-SBA-16, Al-MCM-48, and Al-HMS; or
iii) the amorphous mesoporous material is Al-MCM-41.

* * * * *